(12) United States Patent
Saito et al.

(10) Patent No.: US 12,330,308 B2
(45) Date of Patent: Jun. 17, 2025

(54) ROBOT SYSTEM, PARALLEL LINK MECHANISM, CONTROL METHOD, CONTROL DEVICE, AND STORAGE MEDIUM

(71) Applicant: KABUSHIKI KAISHA TOSHIBA, Tokyo (JP)

(72) Inventors: Masahiro Saito, Yokohama (JP); Taketo Shiba, Yokohama (JP); Yasunori Fuchikami, Yokohama (JP); Hiromasa Takahashi, Minato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 169 days.

(21) Appl. No.: 17/930,270

(22) Filed: Sep. 7, 2022

(65) Prior Publication Data
US 2023/0001581 A1    Jan. 5, 2023

Related U.S. Application Data

(63) Continuation of application No. PCT/JP2021/005497, filed on Feb. 15, 2021.

(30) Foreign Application Priority Data

Mar. 9, 2020    (JP) .................................. 2020-040214

(51) Int. Cl.
*B25J 9/16* (2006.01)
*B23K 31/12* (2006.01)
*B25J 17/02* (2006.01)

(52) U.S. Cl.
CPC .......... *B25J 9/1664* (2013.01); *B23K 31/125* (2013.01); *B25J 9/1623* (2013.01); *B25J 9/1653* (2013.01); *B25J 9/1697* (2013.01); *B25J 17/0216* (2013.01)

(58) Field of Classification Search
CPC ...... B25J 9/1664; B25J 9/1623; B25J 9/1653; B25J 9/1697; B25J 17/0216
(Continued)

(56) References Cited

U.S. PATENT DOCUMENTS 9,908,238 B2    3/2018 Nilsson et al.
2006/0182602 A1    8/2006 Schuler et al.
(Continued)

FOREIGN PATENT DOCUMENTS

| CN | 208961995 U | 6/2019 |
| CN | 110450142 A | 11/2019 |

(Continued)

OTHER PUBLICATIONS

International Search Report issued Apr. 20, 2021, in PCT/JP2021/005497, filed on Feb. 15, 2021 citing documents 6-8, 18-25 therein, 3 pages.
(Continued)

*Primary Examiner* — Adam R Mott
*Assistant Examiner* — Sagar Kc
(74) *Attorney, Agent, or Firm* — Oblon, McClelland, Maier & Neustadt, L.L.P.

(57) ABSTRACT

A robot system according to an embodiment includes an arm mechanism that is articulated, a parallel link mechanism, an end effector, a detector, and a control device. The parallel link mechanism includes a fixed part mounted to a distal part of the arm mechanism, and a movable part that is mounted to the fixed part via multiple parallel links and is movable with respect to the fixed part. The end effector is mounted to the movable part. The detector is provided for detecting a position or orientation of a control point. The control device controls the arm mechanism and the parallel link mechanism. The control device performs a first operation of setting a posture of the control point to a first posture, and a second
(Continued)

operation of setting the posture of the control point to a task posture in which the end effector performs a task.

16 Claims, 16 Drawing Sheets

(58) Field of Classification Search
CPC ........ B25J 17/0266; B25J 9/0051; B25J 9/16; B23K 31/125; G05B 2219/39391; G05B 2219/39552; G05B 2219/40524
See application file for complete search history.

(56) References Cited

U.S. PATENT DOCUMENTS

| | | | |
|---|---|---|---|
| 2014/0060234 A1* | 3/2014 | Uemura | B25J 11/00 74/490.05 |
| 2017/0030444 A1 | 2/2017 | Kurose et al. | |
| 2017/0079731 A1* | 3/2017 | Griffiths | A61B 34/37 |
| 2017/0080576 A1 | 3/2017 | Abdallah et al. | |
| 2018/0050452 A1* | 2/2018 | Ou | B25J 9/1697 |
| 2018/0348729 A1 | 12/2018 | Ueda et al. | |
| 2018/0361590 A1 | 12/2018 | Ting et al. | |
| 2019/0152046 A1* | 5/2019 | Konagai | B25J 5/04 |
| 2019/0224846 A1 | 7/2019 | Pivac | |
| 2020/0003735 A1 | 1/2020 | Ushijima et al. | |
| 2020/0086488 A1* | 3/2020 | Sato | B25J 19/063 |
| 2020/0198132 A1 | 6/2020 | Marui et al. | |

FOREIGN PATENT DOCUMENTS

| | | |
|---|---|---|
| DE | 102016215744 A1 | 3/2018 |
| DE | 10 2016 218 180 B4 | 12/2019 |
| JP | 60-249588 A | 12/1985 |
| JP | 61-278906 A | 12/1986 |
| JP | 2002-239958 A | 8/2002 |
| JP | 2003-71760 A | 3/2003 |
| JP | 2003071760 A * | 3/2003 |
| JP | 2005-528993 A | 9/2005 |
| JP | 2006-224297 A | 8/2006 |
| JP | 2010-247238 A | 11/2010 |
| JP | 2017-530310 A | 10/2017 |
| JP | 2018-167350 A | 11/2018 |
| JP | 2018-202602 A | 12/2018 |
| JP | 2019-48343 A | 3/2019 |
| JP | 2019-63902 A | 4/2019 |
| JP | WO 2019/065873 A1 | 4/2019 |
| JP | 2019-90727 A | 6/2019 |
| JP | 2019-147200 A | 9/2019 |
| JP | 2019-184620 A | 10/2019 |
| WO | WO 2018/181040 A1 | 10/2018 |
| WO | WO 2019/049972 A1 | 3/2019 |
| WO | WO 2019/098232 A1 | 5/2019 |

OTHER PUBLICATIONS

Szufnarowski, "Stewart Platform with Fixed Rotary Actuators: A Low Cost Design Study", 11 Pages.
Isobe et al., Parallel Link High Speed Angle Control Equipment (PHACE), NTN Technical Review No. 80 (2012), 12 Pages (with English translation).
Office Action dated Mar. 24, 2025, issued in corresponding Chinese patent application No. 202180019815.2.

* cited by examiner

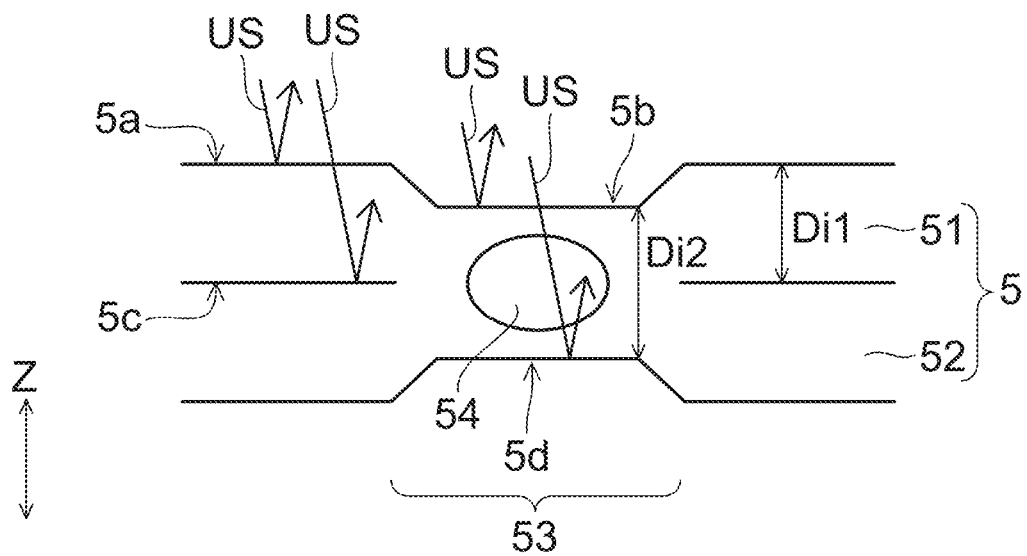
FIG. 12A
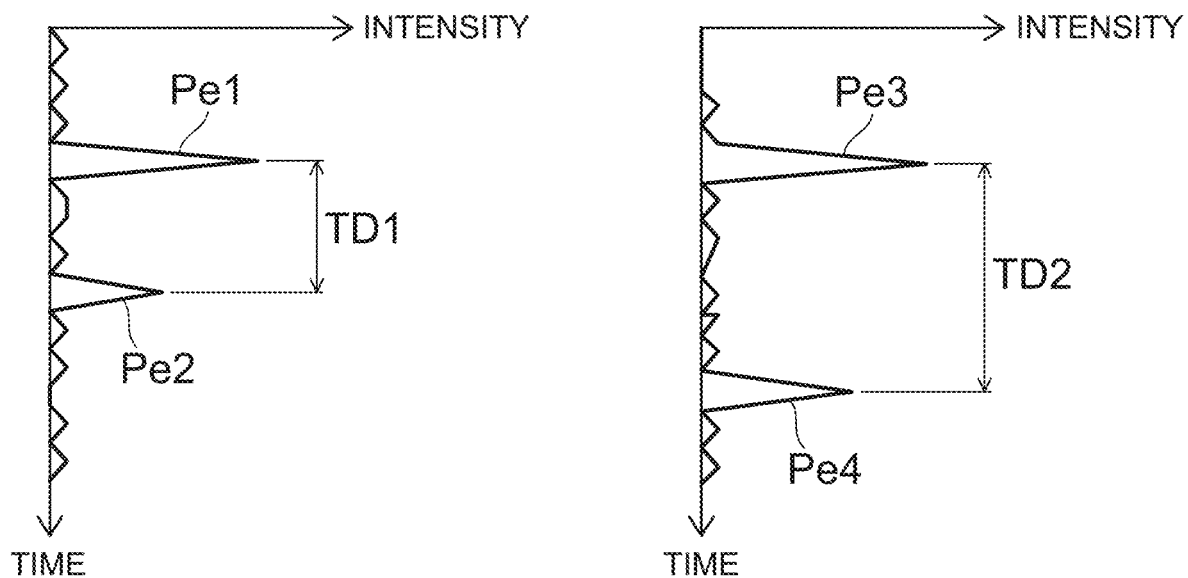
FIG. 12B
FIG. 12C

ROBOT SYSTEM, PARALLEL LINK MECHANISM, CONTROL METHOD, CONTROL DEVICE, AND STORAGE MEDIUM

CROSS-REFERENCE TO RELATED APPLICATIONS

This is a continuation application of International Patent Application PCT/JP2021/005497, filed on Feb. 15, 2021. This application also claims the benefit of priority from Japanese Patent Application No. 2020-040214, filed on Mar. 9, 2020; the entire contents of which are incorporated herein by reference.

FIELD

Embodiments described herein relate generally to a robot system, a parallel link mechanism, a control method, a control device, and a storage medium.

BACKGROUND

Articulated arm mechanisms are widely utilized in industry. For example, when a task is performed using an end effector mounted to an arm mechanism, there are cases where the posture of a control point may be adjusted by feedback control. The operation of the arm mechanism becomes unstable when the posture of the control point is at a singularity vicinity when adjusting. As a result, there is a possibility that the arm mechanism or the end effector may interfere with another member, and more time than normal may be necessary for the task.

BRIEF DESCRIPTION OF THE DRAWINGS

FIGS. 12A to 12C are schematic views for describing an inspection method of the tester;

DETAILED DESCRIPTION

Figure 1:
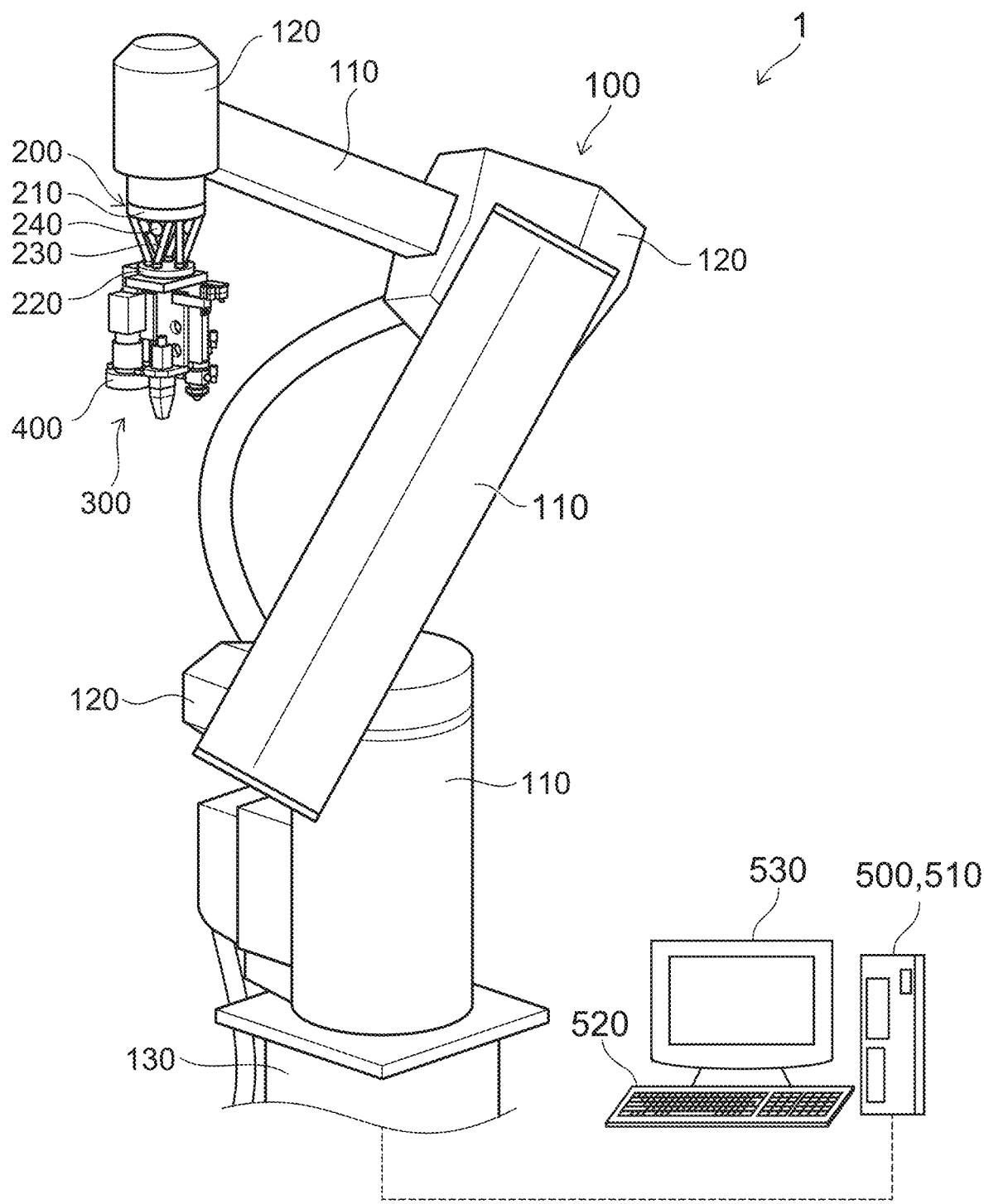
FIG. 1 is a perspective view illustrating a robot system according to an embodiment.

A robot system according to an embodiment includes an arm mechanism that is articulated, a parallel link mechanism, an end effector, a detector, and a control device. The parallel link mechanism includes a fixed part mounted to a distal part of the arm mechanism, and a movable part that is mounted to the fixed part via multiple parallel links and is movable with respect to the fixed part. The end effector is mounted to the movable part. The detector is provided for detecting a position or orientation of a control point. The control device controls the arm mechanism and the parallel link mechanism. The control device performs a first operation of setting a posture of the control point to a first posture by moving the arm mechanism, the first posture being prescribed, and a second operation of setting the posture of the control point to a task posture in which the end effector performs a task by moving the parallel link mechanism based on a detection result of the detector after the first operation. Between the first operation and the second operation, the control device performs calculation processing of calculating a displacement amount of the posture of the control point to the task posture based on the detection result of the detector, and determination processing of determining whether or not the displacement amount is within a range of movement of the movable part. When the displacement amount exceeds the range of movement, the control device performs the second operation after causing the posture of the control point to approach the task posture by moving the arm mechanism.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. In the specification of the application and the drawings, components similar to those described in regard to a drawing thereinabove are marked with like reference numerals, and a detailed description is omitted as appropriate.

FIG. 1 is a perspective view illustrating a robot system according to an embodiment.

As illustrated in FIG. 1, the robot system 1 according to the embodiment includes an arm mechanism 100, a parallel link mechanism 200, an end effector 300, a detector 400, and a control device 500.

The arm mechanism 100 includes multiple links 110 and multiple rotary shafts 120. One end of each link 110 is linked by the rotary shaft 120 to the other one ends. One link 110 rotates with respect to the other links 110 when the rotary shaft 120 is driven by a motor.

The parallel link mechanism 200 is mounted to the distal part of the arm mechanism 100. Specifically, among the multiple links 110, the parallel link mechanism 200 is mounted to any part of the links 110 at one end. Among the multiple links 110, the links 110 at the other end are linked to a base 130. The base 130 is fixed to an installation location such as a floor, a wall, another mechanism, etc.

The parallel link mechanism 200 includes a fixed part 210, a movable part 220, a link 230, and multiple actuators 240. The fixed part 210 is mounted to the distal part of the arm mechanism 100. The movable part 220 is mounted to the fixed part 210 via the multiple links 230. The multiple links 230 are located in parallel between the fixed part 210 and the movable part 220. The multiple links 230 are linked respectively to the multiple actuators 240.

For example, the multiple actuators 240 are motors and are mounted to the fixed part 210. When the multiple actuators 240 respectively drive the multiple links 230, the driving force is transferred to the movable part 220, and the movable part 220 moves with respect to the fixed part 210.

The posture of the fixed part 210 corresponds to the posture of the distal part of the arm mechanism 100 and is determined by the movement of the arm mechanism 100. Here, the posture means the position and the orientation. The posture is determined by the positions in three mutually-orthogonal directions (an X-direction, a Y-direction, and a Z-direction) and the angles (rolling, pitting, and yawing) around each direction. The posture of the movable part 220 is changeable with respect to the posture of the fixed part 210.

It is favorable for the arm mechanism 100 to have not less than four degrees of freedom. For example, the arm mechanism 100 is a vertical articulated robot and has six degrees of freedom. In other words, the arm mechanism 100 can control the position of the distal end of the arm mechanism 100 in each of the three directions and the angle of the distal end around each of the three directions.

Similarly, it is favorable for the parallel link mechanism 200 to have not less than four degrees of freedom. For example, the parallel link mechanism 200 has six degrees of freedom. In other words, the parallel link mechanism 200 can control the position of the movable part 220 in each of the three directions and the angle of the movable part 220 around each of the three directions.

The end effector 300 is mounted to the movable part 220. In other words, the end effector 300 is mounted to the arm mechanism 100 via the parallel link mechanism 200. The posture of the end effector 300 is determined by the movement of the arm mechanism 100 and the movement of the parallel link mechanism 200.

The detector 400 detects the position or orientation of the control point. The control device 500 adjusts the posture of the control point by controlling the arm mechanism 100 and the parallel link mechanism 200. A control point is a point for which the position and the orientation are controlled by the control device 500. For example, a control point is set to any one point of the movable part 220. Or, the control point may be set to any one point of the end effector 300.

The detector 400 includes, for example, at least one of a distance sensor, an optical position sensor, or a camera. The position or the orientation detected by the detector 400 may be absolute or may be relative. For example, as illustrated in FIG. 1, the detector 400 is mounted to the movable part 220. The end effector 300 and the detector 400 are fixed with respect to the movable part 220. Therefore, the posture of the detector 400 corresponds to the posture of the control point. In such a case, the detector 400 detects the relative position or orientation of the control point with respect to a task object. As another example, the detector 400 may be located separately from the arm mechanism 100 and the parallel link mechanism 200. In such a case, the detector 400 detects the absolute position or orientation of the control point in the space in which the arm mechanism 100 and the parallel link mechanism 200 are located.

The control device 500 transmits drive signals to the motors of the arm mechanism 100. The rotation angle of each rotary shaft 120 is controlled according to the drive signal driving each motor. The posture of the distal part of the arm mechanism 100 is controlled thereby. Similarly, the control device 500 transmits drive signals to the actuators 240 of the parallel link mechanism 200. The rotation angle of the rotary shaft of each actuator 240 is controlled according to the drive signal driving each actuator 240. The posture of the movable part 220 with respect to the fixed part 210 is controlled thereby.

For example, when the control device 500 controls the posture of the control point by using only the arm mechanism 100, the control device 500 uses an inverse kinematics calculation to calculate the rotation angles of the rotary shafts 120 so that the posture of the control point becomes the desired posture. When the control device 500 controls the posture of the control point by using only the parallel link mechanism 200, the control device 500 uses an inverse kinematics calculation to calculate the rotation angles of the rotary shafts of the actuators 240 so that the posture of the control point becomes the desired posture.

For example, when the robot system 1 performs a task, the control device 500 uses inverse kinematics to calculate the rotation angles of the rotary shafts 120 so that the posture of the control point becomes a predesigned desired posture. The control device 500 sets the rotation angles of the rotary shafts 120 to the calculated values. The task can be favorably performed by setting the posture of the control point to the desired posture as described above if the position and orientation of the actual task object are as predesigned.

When the position and orientation of the actual task object deviate from the predesigned values, the deviation amounts of the position and posture are detected by the detector 400. The control device 500 uses an inverse kinematics calculation to calculate the rotation angles of the rotary shafts of the actuators 240 to correct the deviation amount. The control device 500 sets the rotation angles of the actuators 240 to the calculated values. Thereby, the posture of the control point is set to correspond to the position and orientation of the actual task object.

In the illustrated example, the arm mechanism 100 and the parallel link mechanism 200 are controlled by one control device 500. The arm mechanism 100 and the parallel link mechanism 200 may be separately controlled by multiple control devices 500.

The range of movement of the movable part 220 with respect to the fixed part 210 is small compared to the range of movement of the distal part of the arm mechanism 100 with respect to the base 130. For example, the control device 500 can roughly adjust the posture of the control point with respect to the task object by moving the arm mechanism 100. The control device 500 can finely adjust the posture of the control point with respect to the task object by moving the parallel link mechanism 200.

The control device 500 may control the posture of the control point according to the detection result of the detector 400. For example, after setting the arm mechanism 100 to the prescribed posture, the control device 500 may finely adjust the posture of the control point by moving the parallel link mechanism 200 according to the detection result of the detector 400.

The control device 500 includes a processing circuit that includes a central processing unit (CPU). The control device 500 is connected to a memory device 510. The memory device 510 includes a storage medium such as read only memory (ROM), random access memory (RAM), a hard disk drive (HDD), a solid state drive (SSD), etc. The control device 500 controls the components of the robot system 1 by reading and executing a program stored in the memory device 510. The control device 500 may store data obtained when operating the robot system 1 in the memory device 510.

As illustrated in FIG. 1, the control device 500 also may be connected with an input device 520 or an output device 530. The input device 520 is used when a user inputs data to the control device 500 or the memory device 510. The input device 520 includes at least one of a keyboard, a mouse, a microphone (audio input), or a touchpad. The output device 530 outputs data output from the control device 500 or data stored in the memory device 510 so that the user can recognize the data. The output device 530 includes at least one of a monitor, a speaker, a printer, or a projector. A device such as a touch panel or the like that functions as both the input device 520 and the output device 530 may be used.

The control device 500 is connected with the arm mechanism 100 and the parallel link mechanism 200 by wired communication, wireless communication, or a network. The control device 500 may include multiple controllers. For example, a controller (a robot controller) that controls the arm mechanism 100, another controller (another robot controller) that controls the parallel link mechanism 200, and another controller that transmits and receives data with these controllers may be included. These controllers are connected by wired communication, wireless communication, or a network. Similarly, the control device 500 may be connected with the memory device 510, the input device 520, and the output device 530 by wired communication, wireless communication, or a network. Two or more of the control device 500, the memory device 510, the input device 520, or the output device 530 may be configured as one device.

Figure 2:
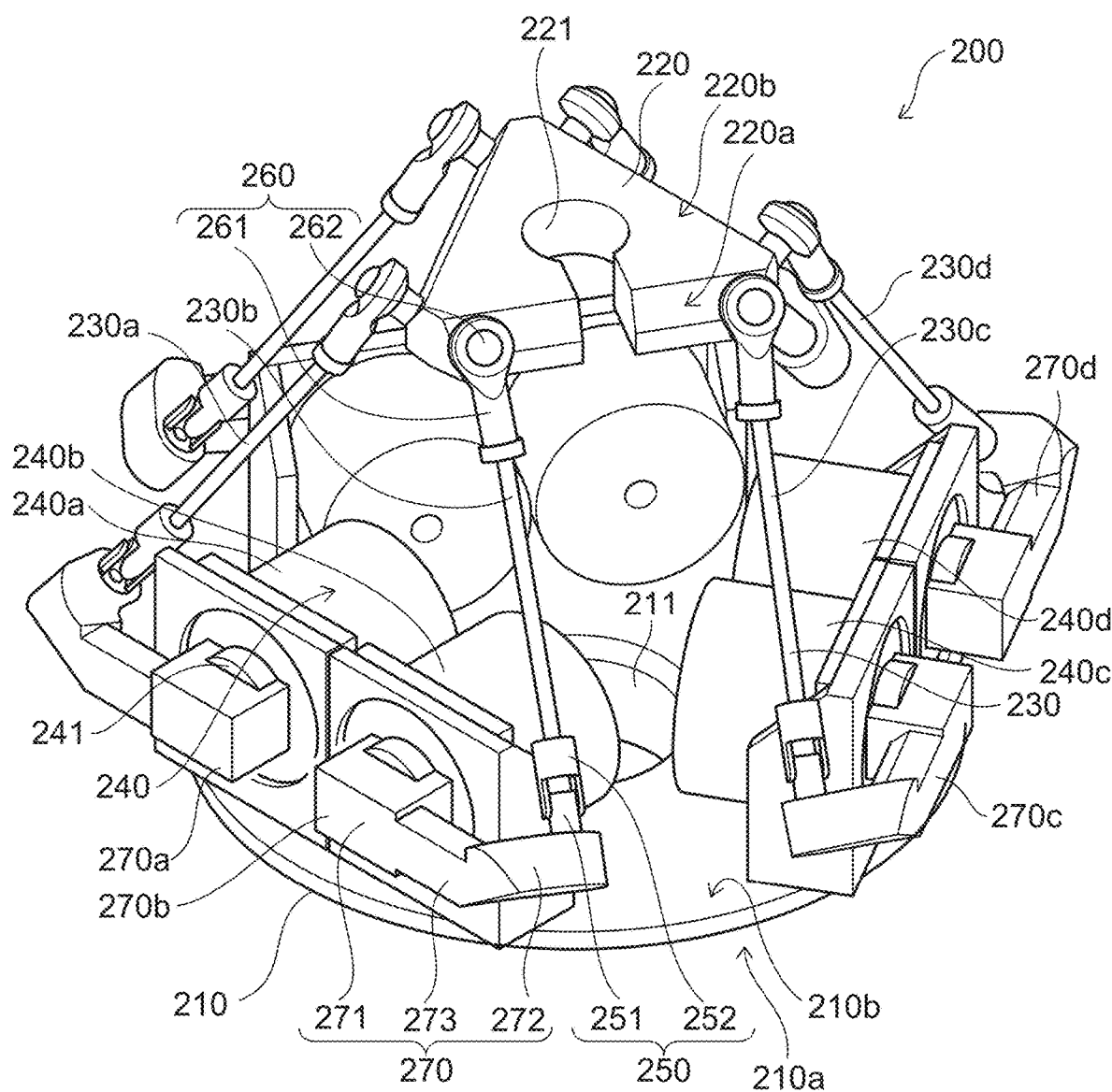
FIG. 2 is a perspective view illustrating a parallel link mechanism according to the embodiment.

FIG. 2 is a perspective view illustrating the parallel link mechanism according to the embodiment.

A favorable example of the parallel link mechanism 200 for the robot system 1 according to the embodiment will be described with reference to FIG. 2. The parallel link mechanism 200 illustrated in FIG. 2 includes the fixed part 210, the movable part 220, the link 230, the actuator 240, a first joint member 250, a second joint member 260, and a rotary arm 270.

Here, for the description, the direction from the fixed part 210 toward the movable part 220 is called "up" (a first direction), and the opposite direction is called "down". These directions are based on the relative positional relationship between the fixed part 210 and the movable part 220 and are independent of the direction of gravity.

In the illustrated example, the fixed part 210 and the movable part 220 have flat plate shapes. The fixed part 210 includes a lower surface 210a mounted to the distal part of the arm mechanism 100, and an upper surface 210b (a first surface) at the side opposite to the lower surface 210a. The actuator 240 is mounted to the upper surface 210b of the fixed part 210. In the example, the actuator 240 is a motor. A rotary shaft 241 of the actuator 240 is along a direction crossing the vertical direction.

A part (a first part 271) of the rotary arm 270 is fixed to the rotary shaft 241. The rotary arm 270 is driven around the rotary shaft 241 by the actuator 240. The first joint member 250 is mounted to another part (a second part 272) of the rotary arm 270. The direction from the first part 271 toward the second part 272 crosses the direction of the rotary shaft 241. The distance in the vertical direction between the movable part 220 and the second part 272 changes when the rotary arm 270 rotates.

A bent part 273 is located between the first part 271 and the second part 272 of the rotary arm 270. The second part 272 is positioned at the movable part 220 side of the first part 271. In other words, the position in the vertical direction of the second part 272 is between the position in the vertical direction of the first part 271 and the position in the vertical direction of the movable part 220. The rotary arm 270 may have a sharp bend or may be smoothly curved at the bent part 273.

One end of the link 230 is linked to the second part 272 of the rotary arm 270 via the first joint member 250. The first joint member 250 is, for example, a universal joint having two degrees of freedom. The first joint member 250 includes couplings 251 and 252. The coupling 251 is fixed to the second part 272 of the rotary arm 270. The coupling 252 is fixed to one end of the link 230.

The other end of the link 230 is linked to the movable part 220 via the second joint member 260. The second joint member 260 is mounted to a side surface 220a (a third surface) of the movable part 220. The side surface 220a is tilted with respect to the vertical direction and faces upward.

The second joint member 260 is, for example, a ball joint having three degrees of freedom. The second joint member 260 includes a ball 261 and a socket 262. The axial center of the socket 262 is fixed to the other end of the link 230 and has spherical contact with the ball 261. The ball 261 is fixed to the side surface 220a. The ball 261 is separated from the side surface 220a to avoid interference with the socket 262 and the movable part 220 when the angle of the socket 262 changes.

The end effector 300 is mounted to an upper surface 220b (a second surface) of the movable part 220. The side surface 220a is connected with the upper surface 220b. When the movable part 220 is in the reference posture, for example, the upper surface 220b is parallel to the upper surface 210b. The reference posture of the movable part 220 refers to the state in which the movable part 220 has a preset designated posture within the range of movement. FIG. 2 illustrates a state in which the movable part 220 is in the reference posture. The movable part 220 is at the position most proximate to the fixed part 210.

A hole 211 (a first hole) for passing the wiring of the multiple actuators 240 and the end effector 300 is provided in the fixed part 210. The hole 211 extends through the fixed part 210 along the vertical direction. A hole 221 (a second hole) for passing the wiring of the end effector 300 is provided in the movable part 220. The hole 221 extends through the movable part 220 along the vertical direction.

For example, the wiring of the end effector 300 is passed through the holes 211 and 221 and drawn out toward the arm mechanism 100. For example, even when the wiring of the end effector 300 is mounted to the distal part of the arm mechanism 100 before mounting the parallel link mechanism 200 to the arm mechanism 100, the parallel link mechanism 200 can be mounted to the arm mechanism 100 while passing the wiring of the end effector 300 through the holes 211 and 221.

Also, the parallel link mechanism 200 can be mounted to a robot system that includes only the arm mechanism 100 and the end effector 300. In such a case, the parallel link mechanism 200 and the end effector 300 can be easily mounted to the distal part of the arm mechanism 100 by detaching the end effector 300 from the arm mechanism 100 and then passing the wiring that was connected to the end effector 300 through the holes 211 and 221 and drawing the wiring out to the distal side of the parallel link mechanism 200.

Six sets of the link 230, the actuator 240, the first joint member 250, the second joint member 260, and the rotary arm 270 are included in the parallel link mechanism 200. For example, an adjacent pair of actuators 240*a* and 240*b* are arranged so that the rotary shafts of the pair of actuators 240*a* and 240*b* are parallel to each other. Similarly, an adjacent pair of actuators 240*c* and 240*d* is arranged so that the rotary shafts of the pair of actuators 240*c* and 240*d* are parallel to each other. Three pairs of actuators 240 are arranged at uniform spacing around the hole 211.

A pair of rotary arms 270*a* and 270*b* is linked respectively to the pair of actuators 240*a* and 240*b* so that the second parts 272 of the pair of rotary arms 270*a* and 270*b* face mutually-opposite directions. Similarly, a pair of rotary arms 270*c* and 270*d* is linked respectively to the pair of actuators 240*c* and 240*d* so that the second parts 272 of the pair of rotary arms 270*c* and 270*d* face mutually-opposite directions.

The link 230 that is linked to one of the pair of rotary arms 270 and the link 230 that is linked to one other of the pair of rotary arms 270 are linked to the same side surface 220*a*. For example, a link 230*b* that is linked to the rotary arm 270*b* and a link 230*c* that is linked to a rotary arm 270*c* are linked to the same side surface 220*a*. A link 230*a* that is linked to the rotary arm 270*a* and a link 230*d* that is linked to a rotary arm 270*d* are linked to another side surface 220*a*. The postures of the movable part 220 and the end effector 300 are controlled by independently controlling the rotation angles of the rotary shafts 241 of the six actuators 240.

The size of the upper surface 220*b* of the movable part 220 is smaller than the size of the upper surface 210*b* of the fixed part 210. For example, the dimension of the upper surface 220*b* in one direction crossing the vertical direction is less than the dimension of the upper surface 210*b* in the one direction.

The link 230 is tilted with respect to the vertical direction toward the movable part 220 in the state in which the movable part 220 is in the reference posture. The axial centers of the coupling 252 and the socket 262 are arranged along the link 230.

By providing the bent part 273, the declination of the first joint member 250 in the state in which the movable part 220 is in the reference posture can be reduced. By tilting the side surface 220*a* with respect to the vertical direction, the declination of the second joint member 260 can be reduced. For example, the angle of the bent part 273 is set so that the declination of the first joint member 250 in the state in which the movable part 220 is in the reference posture is 0 degrees. The tilt of the side surface 220*a* with respect to the vertical direction is set so that the declination of the second joint member 260 in the state in which the movable part 220 is in the reference posture is 0 degrees. Thereby, the range of movement of the movable part 220 with respect to the fixed part 210 can be increased while suppressing the enlargement of the parallel link mechanism 200.

Figure 3A:
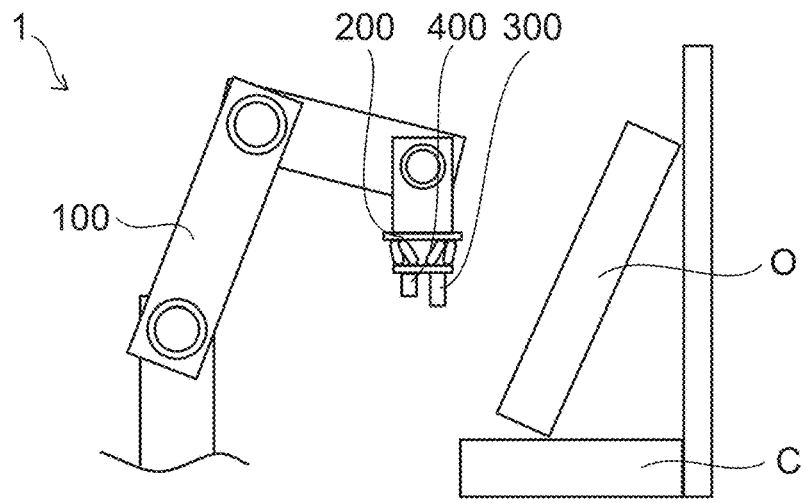
FIGS. 3A to 3C are schematic views illustrating an operation of the robot system according to the embodiment.
Figure 3B:
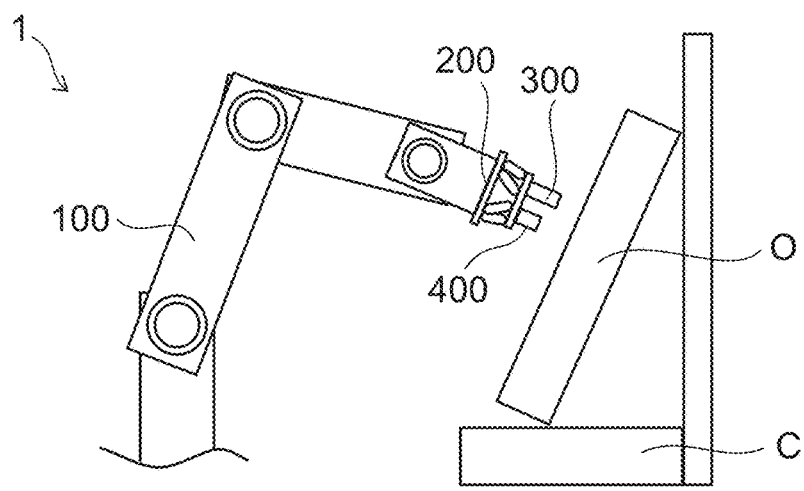
Figure 3C:
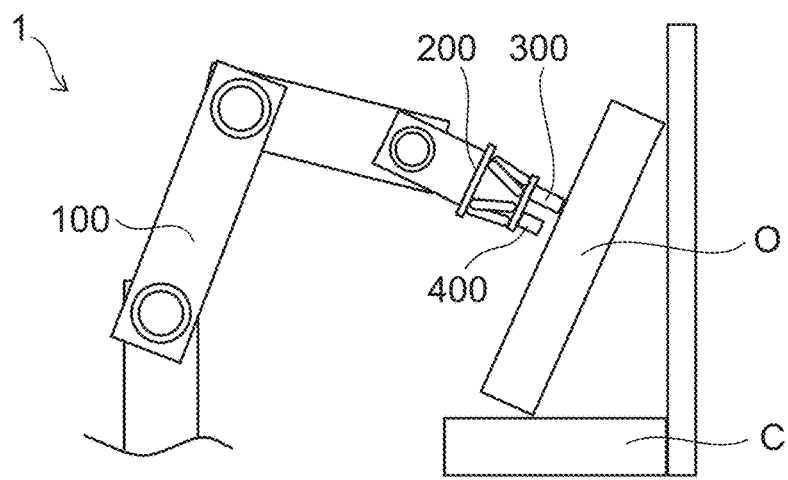

FIGS. 3A to 3C are schematic views illustrating an operation of the robot system according to the embodiment.

In the example illustrated in FIGS. 3A to 3C, the robot system 1 performs a prescribed task on a task object O by using the end effector 300.

First, as illustrated in FIG. 3A, the task object O is transferred to the location at which the arm mechanism 100 is installed. As illustrated in FIG. 3A, the task object O may be transferred by a transfer device C or may be transferred by a human. The specific form of the transfer device C is arbitrary. Or, the arm mechanism 100 may be moved by being mounted on an automated guided vehicle (AGV), etc. The posture of the control point at this time is arbitrary. In the example, the control point is set to the tip of the end effector 300.

The control device 500 performs a first operation. In the first operation, the control device 500 moves the arm mechanism 100 and sets the posture of the control point to a prescribed first posture as illustrated in FIG. 3B. The first operation may be performed to cause the distal part of the arm mechanism 100 to have the prescribed posture. If the parallel link mechanism 200 and the end effector 300 are not operated in the first operation, then the posture of the control point is determined when the posture of the distal part of the arm mechanism 100 is determined. Thus, posture of control point may be indirectly set to the first posture.

After the first operation, the detector 400 detects the position or orientation of the control point. For example, the position or orientation of the control point when the distal part of the arm mechanism 100 has the first posture is detected. The control device 500 performs a second operation. In the second operation, the control device 500 moves the parallel link mechanism 200 as illustrated in FIG. 3C. At this time, the control device 500 adjusts the posture of the control point according to the detection result of the detector 400. Thereby, the posture of the control point is set to a posture that is suited to the task of the end effector 300.

After the first operation and the second operation, the end effector 300 performs the task on the task object O. When the task is being performed, the control device 500 may adjust the posture of the control point according to the detection result of the detector 400. For example, the control device 500 adjusts the posture of the control point in the task by moving the parallel link mechanism 200. The task is, for example, coating, welding, inspection, tightening, assembly, cutting, etc. The specific configuration of the end effector 300 is determined according to the task to be performed.

Effects of the embodiment will now be described.

When the control device 500 moves the arm mechanism 100, for example, an inverse kinematics calculation is used to determine the rotation angles or rotational speeds of the rotary shafts 120 of the arm mechanism 100 based on the movement command for the control point. On the other hand, control singularities of the arm mechanism 100 exist. Control singularity refers to a posture (a position and an orientation) for which the rotation angles of the rotary shafts 120 cannot be determined by an inverse kinematics calculation. The rotation angles of the rotary shafts 120 cannot be uniquely determined at a singularity. Therefore, the posture of the arm mechanism 100 cannot be set to such a posture. The operation of the arm mechanism 100 may become unstable proximate to the singularity. Hereinbelow, the posture at the singularity and proximate to the singularity is collectively called the "singularity vicinity".

Figure 4A:
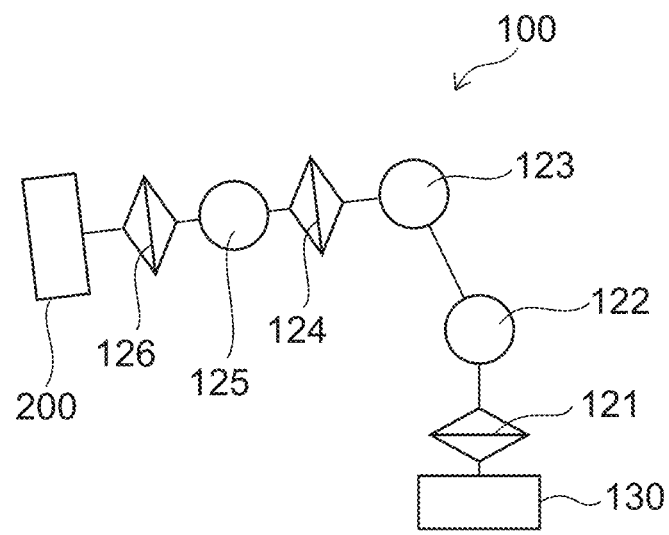
FIGS. 4A and 4B are schematic views illustrating singularities of a control point.
Figure 4B:
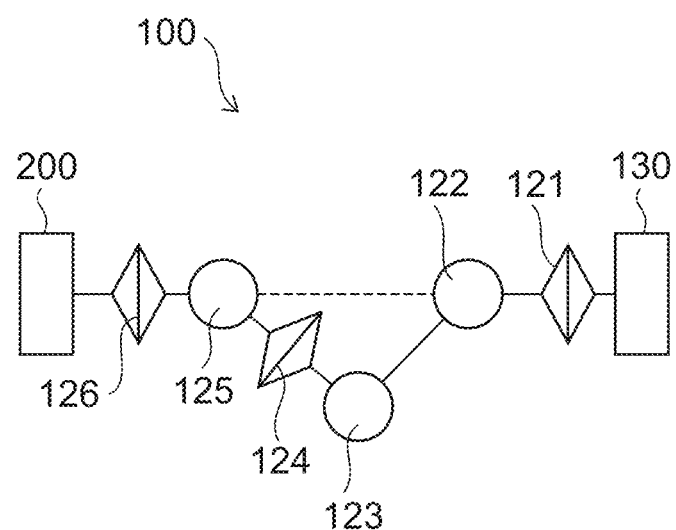

FIGS. 4A and 4B are schematic views illustrating singularities of the control point.

FIG. 4A illustrates the state when the arm mechanism 100 is viewed from the side. FIG. 4B illustrates the state when the arm mechanism 100 is viewed from above. The multiple rotary shafts 120 include rotary shafts 121 to 126 from the base 130 toward the parallel link mechanism 200. As illustrated in FIG. 4A, when the rotation center of the rotary shaft 124 and the rotation center of the rotary shaft 126 are arranged on the same straight line, the parallel link mechanism 200 can be rotated by rotating either the rotary shaft 124 or 126. When the rotation center of the rotary shaft 121 and the rotation center of the rotary shaft 126 are arranged on the same straight line as illustrated in FIG. 4B as well, the parallel link mechanism 200 can be rotated by rotating either the rotary shaft 124 or 126. For the postures illustrated in FIGS. 4A and 4B, the rotation angles of the rotary shafts 121 to 126 are not uniquely determined by an inverse kinematics calculation. Therefore, there is a possibility that the arm mechanism 100 may be uncontrollable when the posture of the control point is at a singularity vicinity.

For example, an operation of the arm mechanism 100 such that the posture of the control point is not at a singularity vicinity can be taught when exactly the same movement of the arm mechanism 100 is repeated by the teaching playback method. However, when the posture of the control point is adjusted by feedback control, the control point may have a posture that is not taught. Therefore, there is a possibility that the posture of the control point may be at a singularity vicinity when adjusting the posture of the control point.

For this problem, in the robot system 1 according to the embodiment, the parallel link mechanism 200 is located at the distal part of the arm mechanism 100. In the parallel link mechanism 200, the drive amounts of the actuators 240 are uniquely determined by an inverse kinematics calculation based on the movement command for the control point. Therefore, the parallel link mechanism 200 does not have a singularity at which the rotation angle cannot be determined as in the arm mechanism 100. For example, the control device 500 moves the parallel link mechanism 200 when adjusting the posture of the control point based on the detection result of the detector 400. Thereby, the posture of the control point can be adjusted without moving the arm mechanism 100. Or, the arm mechanism 100 can adjust the posture of the control point based on the detection result while performing only preprogrammed operations. Thereby, the posture of the distal part of the arm mechanism 100 can avoid the singularity vicinity even when the posture of the end effector 300 is adjusted by feedback control.

Feedback control is particularly necessary when a sophisticated task is performed by the robot system 1. Examples include coating when, for example, the posture of the end effector 300 is adjusted to follow a detailed shape of the surface of the task object or when the posture of the end effector 300 is adjusted to correct a micro misalignment of the task object. Examples include an inspection when the posture of the end effector 300 is adjusted to obtain a more appropriate inspection result based on information obtained from the task object in the inspection.

It becomes difficult to correctly complete the task if the posture of the distal part of the arm mechanism 100 is at a singularity vicinity in these tasks. Accordingly, the robot system 1 according to the embodiment is especially favorably for use when it is necessary to adjust the posture of the end effector 300 based on the detection result of the detector 400 in the task.

The parallel link mechanism 200 illustrated in FIG. 2 is favorably used in the robot system 1. According to the parallel link mechanism 200, the range of movement of the movable part 220 with respect to the fixed part 210 can be increased while suppressing an enlargement. For example, the parallel link mechanism 200 can suppress interference with the task object in the task of the end effector 300.

The following operations may be performed in the robot system 1.

Figure 5A:
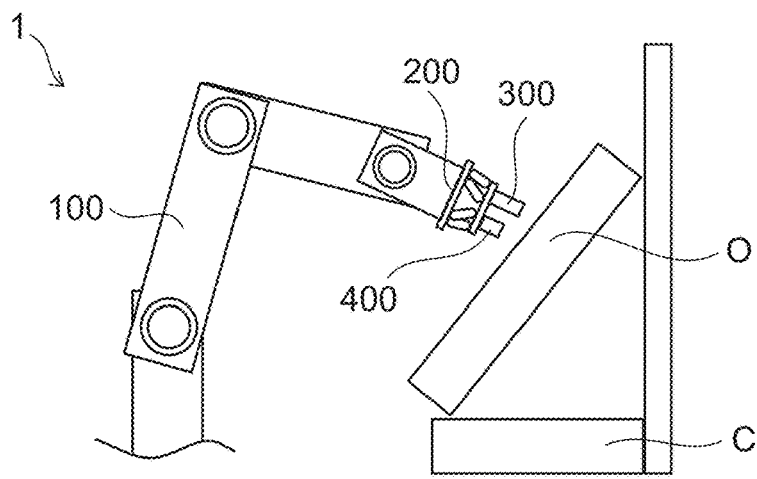
FIGS. 5A to 5C are schematic views illustrating an example of an operation of the robot system according to the embodiment.
Figure 5B:
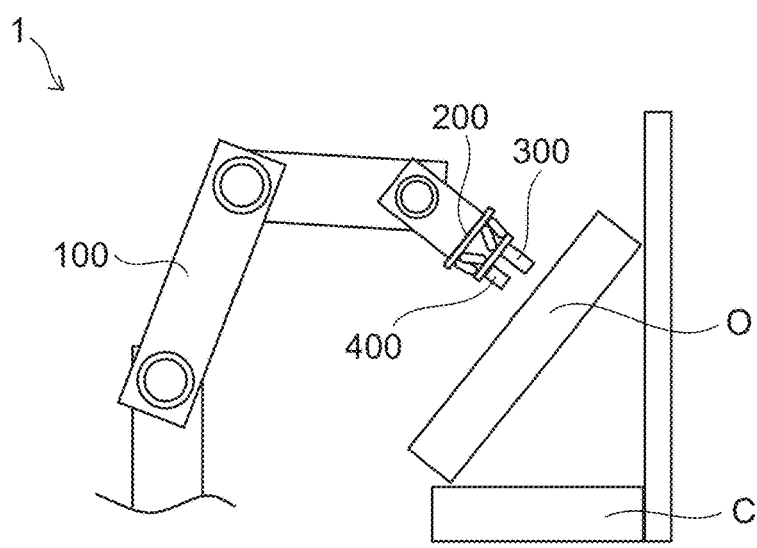
Figure 5C:
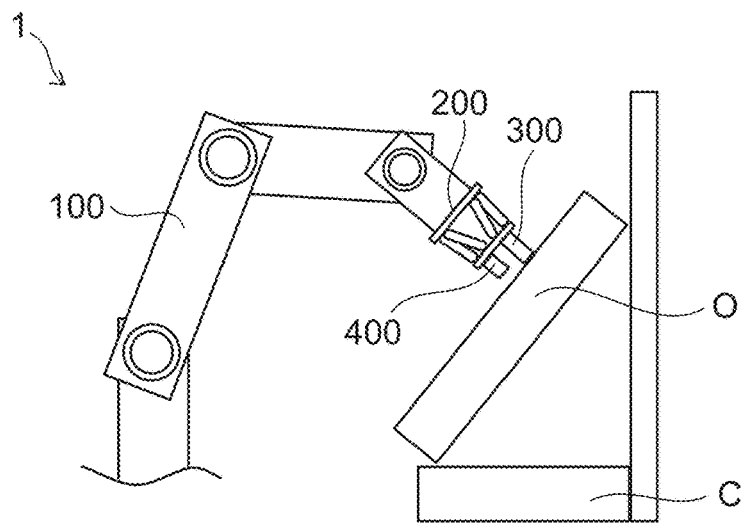

FIGS. 5A to 5C are schematic views illustrating an example of an operation of the robot system according to the embodiment.

FIG. 5A illustrates the state after the first operation is performed by the control device 500. At this time, the posture of the control point is set to the preprogrammed first posture.

After the first operation, based on the detection result of the detector 400, the control device 500 calculates the displacement amount necessary to set the posture of the control point to the task posture in which the end effector 300 performs the task. The displacement amount is represented by the movement amounts in the X-direction, the Y-direction, and the Z-direction and the rotation angles of rolling, pitting, and yawing. The control device 500 compares the displacement amount to the range of movement of the parallel link mechanism 200. As one specific example, the control device 500 calculates the displacement amount from the first posture to the task posture and compares the displacement amount with the range of movement of the parallel link mechanism 200 when the control point is at the first posture.

When the displacement amount exceeds the range of movement, the control device 500 corrects the posture of the control point to reduce the displacement amount as illustrated in FIG. 5B. Subsequently, as illustrated in FIG. 5C, based on the detection result when the control point is at the corrected posture, the control device 500 sets the posture of the control point to the task posture by moving the parallel link mechanism 200.

According to the operation, the control point can be set to the desirable posture while suppressing the unprogrammed movement of the arm mechanism 100 as much as possible.

FIG. 6A, FIG. 6B, FIG. 7A, and FIG. 7B are schematic views illustrating another example of an operation of the robot system according to the embodiment.

Figure 6A:
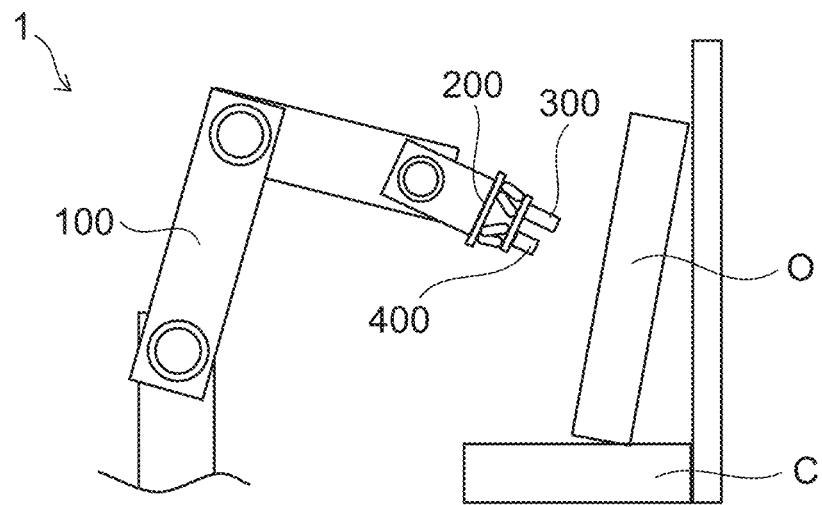
FIGS. 6A and 6B are schematic views illustrating another example of an operation of the robot system according to the embodiment.

Similarly to FIG. 5A, FIG. 6A illustrates a state in which the posture of the control point is set to the first posture. Subsequently, as illustrated in FIG. 6B, the control device 500 may correct the posture of the control point by moving the arm mechanism 100 based on the detection result of the detector 400 regardless of the displacement amount from the first posture to the task posture.

According to the detection result, it may be necessary to greatly move the parallel link mechanism 200 in the task of the end effector 300. At this time, it is necessary to move the arm mechanism 100 in the task when the desirable posture of the control point calculated from the detection result is outside the range of movement of the parallel link mechanism 200. In such a case, the adjustment of the posture by the parallel link mechanism 200 is suspended, and the posture of the control point is adjusted by the parallel link mechanism 200 again after the arm mechanism 100 is operated. To reduce the number of operations of the parallel link mechanism 200, the posture of the control point may be set to the correction posture by moving the arm mechanism 100 before setting the control point to the task posture.

For example, in the correction operation, the posture of the control point is corrected so that the posture of the control point is in a prescribed first state with respect to the task object O. In the first state, the displacement amount necessary to set the posture of the control point to the task posture is less than the displacement amount from the first posture to the task posture. It is favorable for the first state to be determined so that the range of movement of the parallel link mechanism 200 is wider even after the parallel link mechanism 200 adjusts the posture of the control point.

Figure 6B:
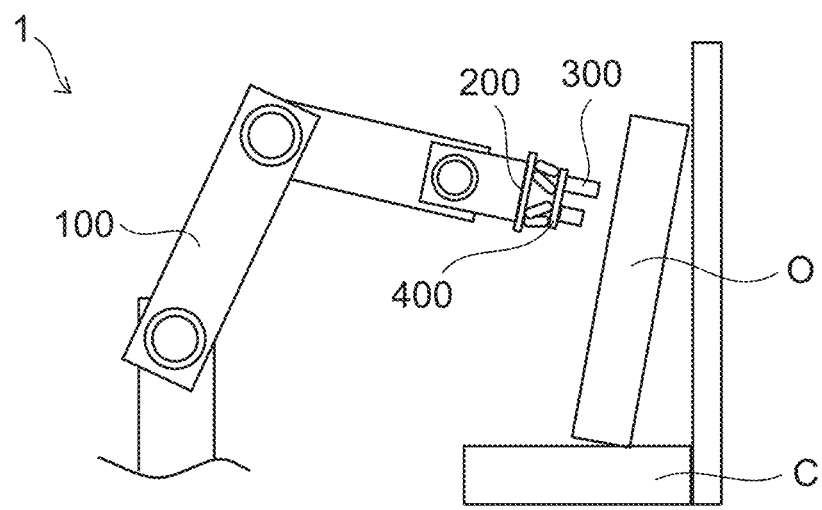

On the other hand, when the posture of the control point is set with respect to the task object O as illustrated in FIG. 6B, there is a possibility that some of the rotary shafts may be arranged in a straight line, and the posture of the distal part of the arm mechanism 100 may be at the singularity vicinity. Therefore, in the correction operation, the control device 500 sets the correction posture so that the posture of the distal part of the arm mechanism 100 is outside the singularity vicinity.

Specifically, after the first operation, the control device 500 calculates the posture of the control point to be in the first state with respect to the task object O. The control device 500 determines whether or not the posture of the distal part of the arm mechanism 100 is at a singularity vicinity at the calculated posture. The control device 500 sets the posture of the control point to the first state when the posture of the distal part is at a singularity vicinity. When the posture of the distal part is at a singularity vicinity, the control device 500 corrects the posture of the control point so that the posture of the control point with respect to the task object O is in a second state. Compared to the first state, the displacement amount to the task posture is large in the second state.

Specifically, the displacement amount necessary to set the posture of the control point to the task posture in the second state is less than the displacement amount from the first posture to the task posture. The displacement amount necessary to set the posture of the control point to the task posture in the second state is greater than the displacement amount necessary to set the posture of the control point to the task posture in the first state.

Figure 7A:
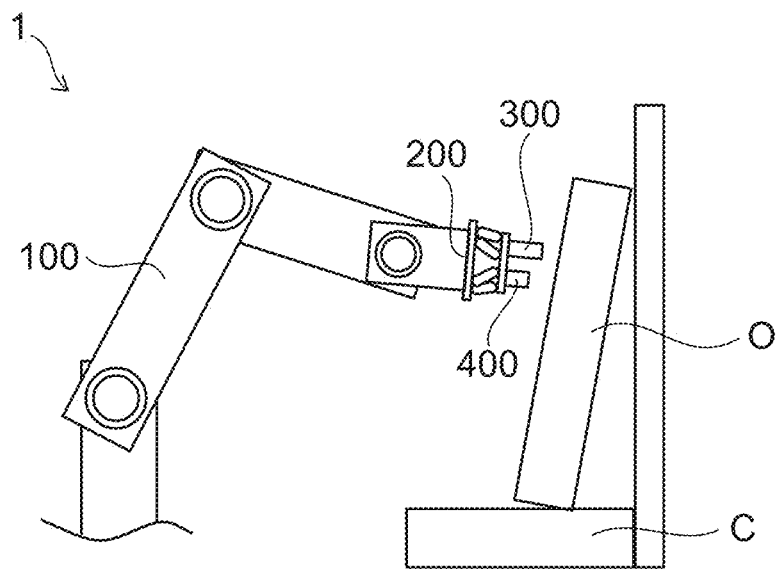
FIGS. 7A and 7B are schematic views illustrating another example of an operation of the robot system according to the embodiment.
Figure 7B:
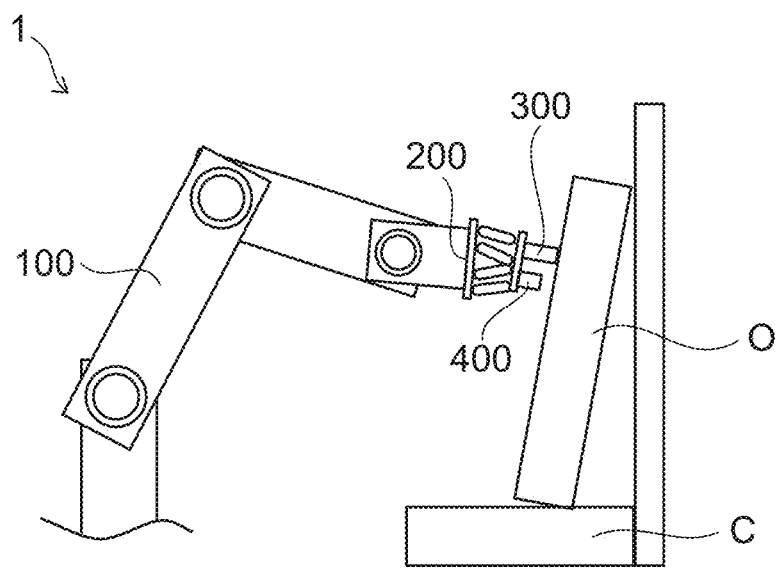

By correcting the posture of the distal part of the arm mechanism 100 to be outside the singularity vicinity, for example, the posture of the control point with respect to the task object O is set to the second state as illustrated in FIG. 7A. Subsequently, as illustrated in FIG. 7B, the control device 500 sets the posture of the control point to the task posture by moving the parallel link mechanism 200.

According to the operation, it is easy to use only the parallel link mechanism 200 to adjust the posture of the control point based on the detection result in the task while avoiding the posture of the distal part of the arm mechanism 100 being at the singularity vicinity.

Figure 8:
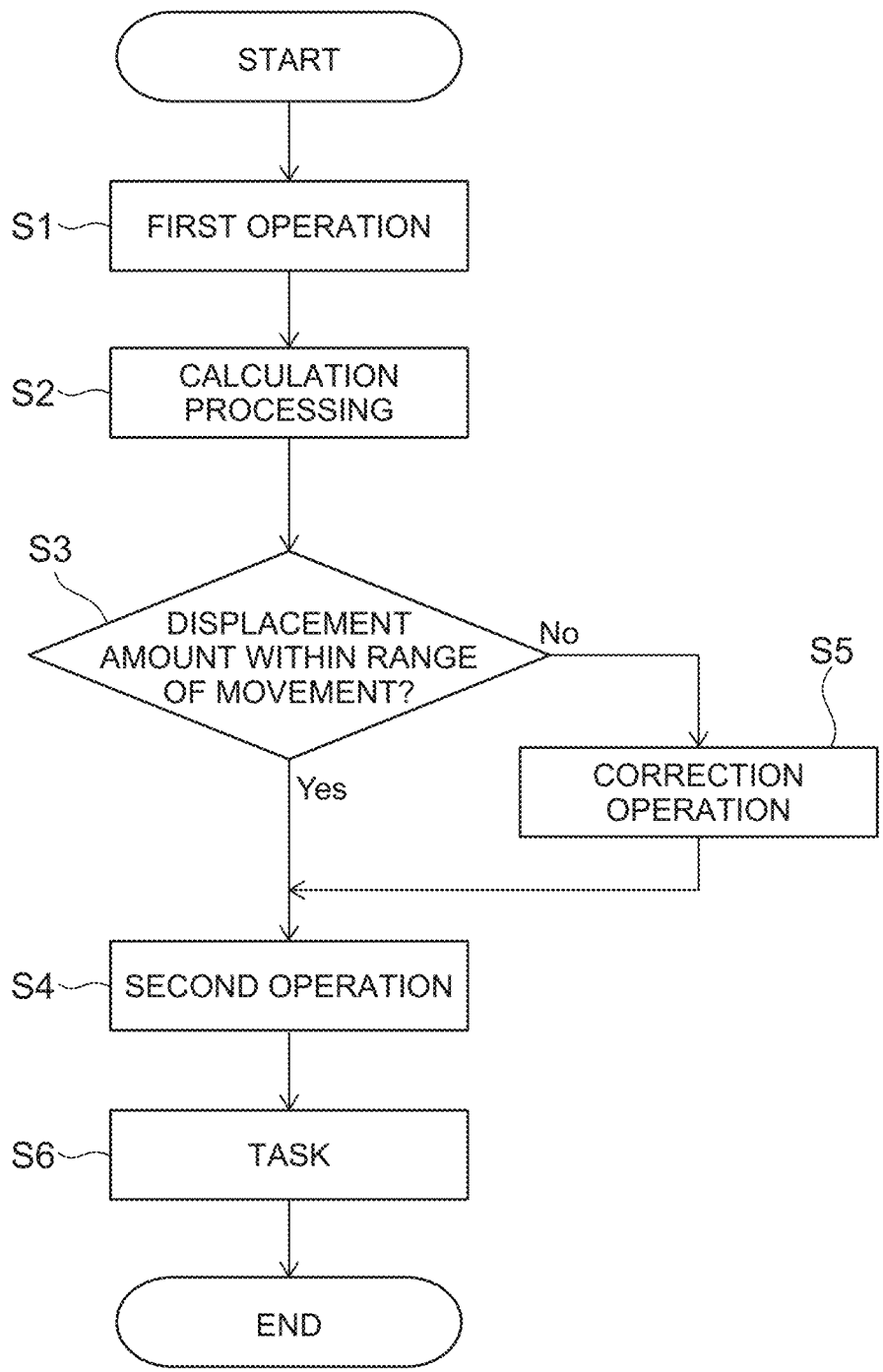
FIG. 8 is a flowchart illustrating an operation of the robot system according to the embodiment.
Figure 9:
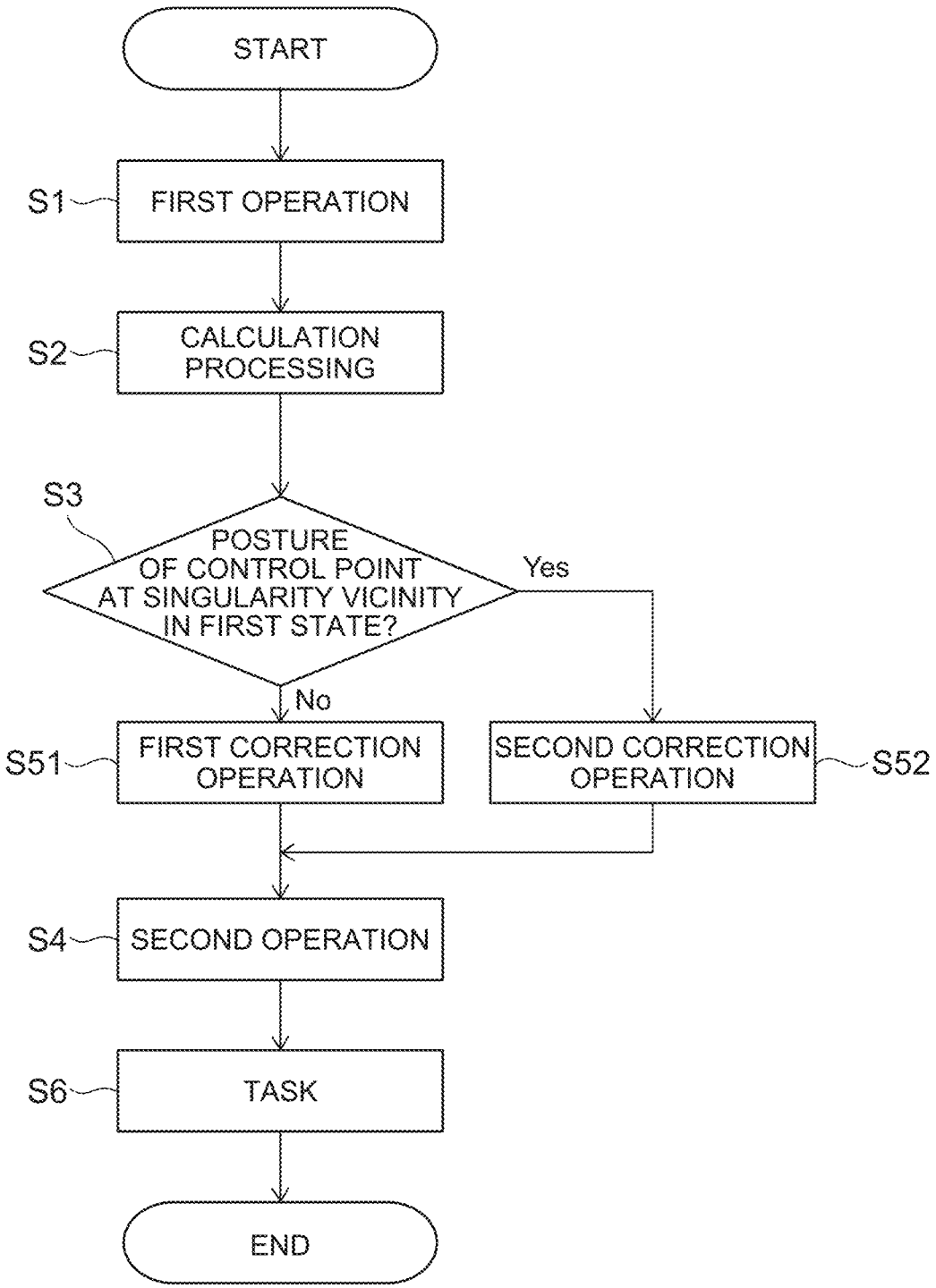
FIG. 9 is a flowchart illustrating an operation of the robot system according to the embodiment.

FIGS. 8 and 9 are flowcharts illustrating operations of the robot system according to the embodiment.

FIG. 8 shows the operation illustrated in FIGS. 5A to 5C. First, the control device 500 performs the first operation (a first step) (step S1). In the first operation, the posture of the control point is set to the prescribed first posture by operating the arm mechanism 100. The control device 500 performs calculation processing (a calculation step) (step S2). In the calculation processing, the displacement amount of the posture of the control point to the task posture is calculated based on the detection result of the detector 400. The control device 500 performs determination processing (a determination step) (step S3). In the determination processing, it is determined whether or not the displacement amount is within the range of movement of the movable part 220.

When the displacement amount is within the range of movement, the control device 500 performs the second operation (a second step) (step S4). In the second operation, the posture of the control point is set to the task posture by operating the parallel link mechanism 200 based on the detection result of the detector 400. When the displacement amount is outside the range of movement, the control device 500 performs the correction operation (a correction step) (step S5). In the correction operation, the posture of the control point is caused to approach the task posture by operating the arm mechanism 100. Subsequently, the second operation is performed.

The control device 500 performs the task (step S6). The task is performed using the end effector 300. In the task, the posture of the control point is adjusted based on the detection result of the detector 400. The adjustment of the posture based on the detection result is performed by the parallel link mechanism 200.

FIG. 9 shows the operation illustrated in FIG. 6A, FIG. 6B, FIG. 7A, and FIG. 7B. The control device 500 performs the first operation (step S1) and performs the calculation processing (step S2). In the calculation processing, the posture of the control point to be in the first state with respect to the task object O is calculated based on the detection result of the detector 400. The control device 500 performs the determination processing (step S3). In the determination processing, it is determined whether or not the posture of the distal part of the arm mechanism 100 is at the singularity vicinity in the first state.

When the posture of the distal part of the arm mechanism 100 is at the singularity vicinity in the first state, the control device 500 performs a first correction operation (step S51). In the first correction operation, the posture of the control point with respect to the task object O is set to the first state by operating the arm mechanism 100. When the posture of the distal part of the arm mechanism 100 is at the singularity vicinity in the first state, the control device 500 performs a second correction operation (step S52). In the second correction operation, the posture of the control point with respect to the task object O is set to the second state by operating the arm mechanism 100. After the first correction operation or the second correction operation, the control device 500 performs the second operation (step S4) and performs the task (step S6).

Figure 10:
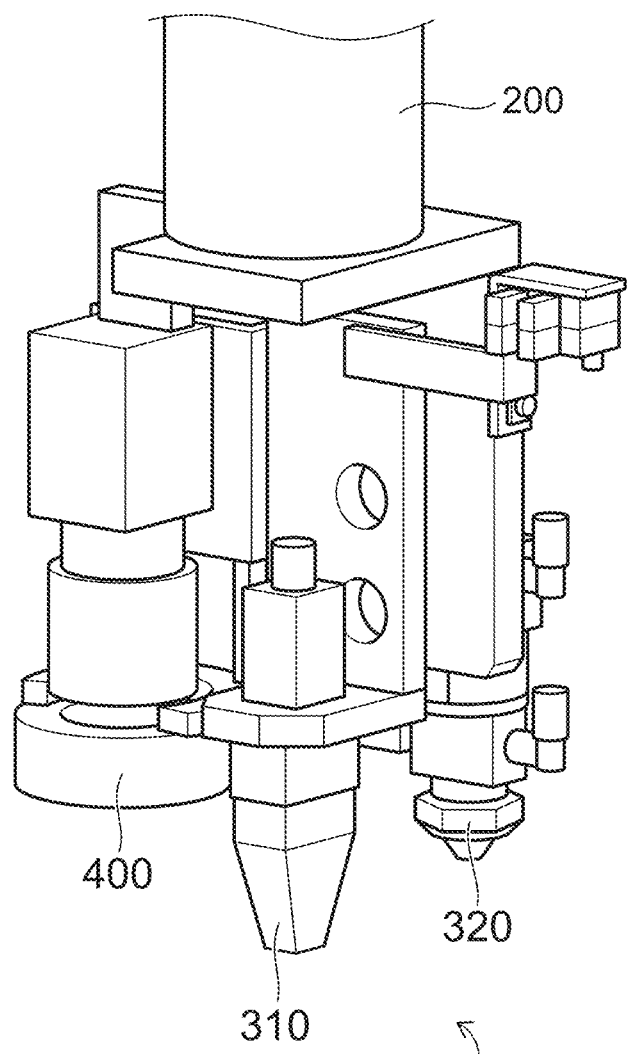
FIG. 10 is a perspective view illustrating an end effector of the robot system according to the embodiment.

FIG. 10 is a perspective view illustrating the end effector of the robot system according to the embodiment.

An example of the end effector 300 used in the robot system 1 according to the embodiment will now be described with reference to FIG. 10. In the example illustrated in FIG. 10, a tester 310 and a coating device 320 are provided as the end effector 300. In the example, the task object O is a welded member, and an inspection is performed as the task. The control point is set to the tip of the tester 310.

The tester 310 includes multiple ultrasonic sensors for inspecting a weld portion. The coating device 320 coats a couplant on the upper surface of the weld portion. The couplant is used to provide acoustic matching of the ultrasonic wave between the tester 310 and the inspection object. The couplant may be a liquid or may be a gel. In the example, a camera is provided as the detector 400 adjacent to the tester 310 and the coating device 320. The detector 400 acquires an image by imaging the welded member. The detector 400 extracts the weld mark from the image and detects the position of the weld portion.

Figure 11:
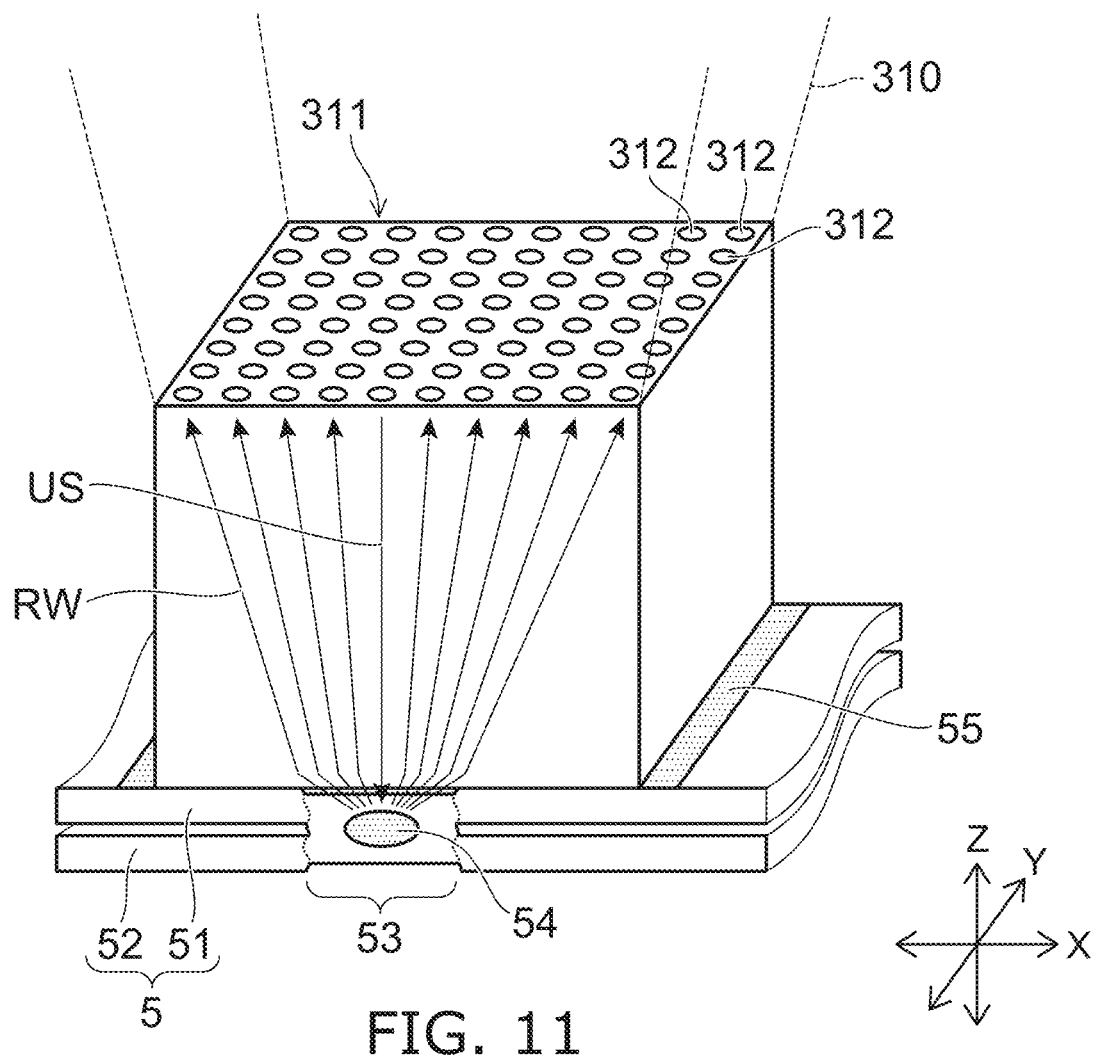
FIG. 11 is a perspective view illustrating the internal structure of a tester tip.

FIG. 11 is a perspective view illustrating the internal structure of the tester tip. A matrix sensor 311 illustrated in FIG. 11 is located inside the tester 310 tip. The matrix sensor 311 includes multiple ultrasonic sensors 312. The ultrasonic sensors 312 are, for example, transducers. The multiple ultrasonic sensors 312 are arranged along two directions (the X-direction and the Y-direction) that cross each other. In the example, the X-direction and the Y-direction are orthogonal. The X-direction and the Y-direction in which the multiple ultrasonic sensors 312 are arranged may or may not correspond to the X-direction and the Y-direction of the coordinate system of the position of the control point.

The control device 500 moves the parallel link mechanism 200 to move the tester 310 along the Z-direction crossing a plane including the X-direction and the Y-direction. The control device 500 causes the tester 310 to contact the inspection object and inspects the weld portion.

FIG. 11 illustrates a state of inspecting a member 5. The member 5 is made by spot-welding a metal plate 51 (a first member) and a metal plate 52 (a second member) at a weld portion 53. A solidified portion 54 is formed at the weld portion 53 by a portion of the metal plate 51 and a portion of the metal plate 52 melting, mixing, and solidifying. Each of the ultrasonic sensors 312 transmits an ultrasonic wave US toward the member 5 coated with a couplant 55 and receives a reflected wave RW from the member 5.

In a more specific example as illustrated in FIG. 11, one ultrasonic sensor 312 transmits the ultrasonic wave US toward the weld portion 53. A portion of the ultrasonic wave US is reflected by the upper or lower surface of the member 5, etc. Each of the multiple ultrasonic sensors 312 receives (detects) the reflected wave RW. The weld portion 53 vicinity of the member 5 is two-dimensionally inspected by each of the ultrasonic sensors 312 sequentially transmitting the ultrasonic wave US, and by the multiple ultrasonic sensors 312 receiving the reflected waves RW.

FIG. 12 is schematic views for describing the inspection method of the tester.

As illustrated in FIG. 12A, a portion of the ultrasonic wave US is reflected by an upper surface 5a of the metal plate 51 or an upper surface 5b of the weld portion 53. Another portion of the ultrasonic wave US enters the member 5 and is reflected by a lower surface 5c of the metal plate 51 or a lower surface 5d of the weld portion 53.

The Z-direction positions of the upper surface 5a, the upper surface 5b, the lower surface 5c, and the lower surface 5d are different from each other. In other words, the distances in the Z-direction between the ultrasonic sensor 312 and these surfaces are different from each other. The peaks of the intensities of the reflected waves are detected when the ultrasonic sensor 312 receives the reflected waves from these surfaces. Which surface reflected the ultrasonic wave US can be verified by calculating the time until each peak is detected after transmitting the ultrasonic wave US.

FIGS. 12B and 12C are graphs illustrating the relationship between the time after transmitting the ultrasonic wave US and the intensity of the reflected wave RW. Here, the intensity of the reflected wave RW is illustrated as an absolute value. The graph of FIG. 12B illustrates the reception result of the reflected wave RW from the upper surface 5a and the lower surface 5c of the metal plate 51. The graph of FIG. 12C illustrates the reception result of the reflected wave RW from the upper surface 5b and the lower surface 5d of the weld portion 53.

In the graph of FIG. 12B, a peak Pe1 occurring first is based on the reflected wave RW from the upper surface 5a. A peak Pe2 occurring second is based on the reflected wave RW from the lower surface 5c. The times at which the peak Pe1 and the peak Pe2 are detected correspond respectively to the Z-direction positions of the upper surface 5a and the lower surface 5c of the metal plate 51. A time difference TD1 between the time at which the peak Pe1 is detected and the time at which the peak Pe2 is detected corresponds to a distance Di1 in the Z-direction between the upper surface 5a and the lower surface 5c.

Similarly, in the graph of FIG. 12C, a peak Pe3 occurring first is based on the reflected wave RW from the upper surface 5b. A peak Pe4 occurring second is based on the reflected wave RW from the lower surface 5d. The times at which the peak Pe3 and the peak Pe4 are detected correspond respectively to the Z-direction positions of the upper surface 5b and the lower surface 5d of the weld portion 53. A time difference TD2 between the time at which the peak Pe3 is detected and the time at which the peak Pe4 is detected corresponds to a distance Di2 in the Z-direction between the upper surface 5b and the lower surface 5d.

The control device 500 inspects whether or not multiple points at the weld portion 53 vicinity are welded based on the time difference of the adjacent peaks. There are cases where the upper surface 5b and the lower surface 5d of the weld portion 53 are tilted with respect to the upper surface 5a of the metal plate 51. This is due to the weld portion 53 including the solidified portion 54, shape deformation in the welding process, etc. In such a case, it is desirable for the ultrasonic waves US to be transmitted along a direction that is, on average, perpendicular to the upper surface 5b or the lower surface 5d. Thereby, the ultrasonic waves can be reflected more intensely at the upper surface 5b and the lower surface 5d, and the accuracy of the inspection can be increased.

Figure 13:
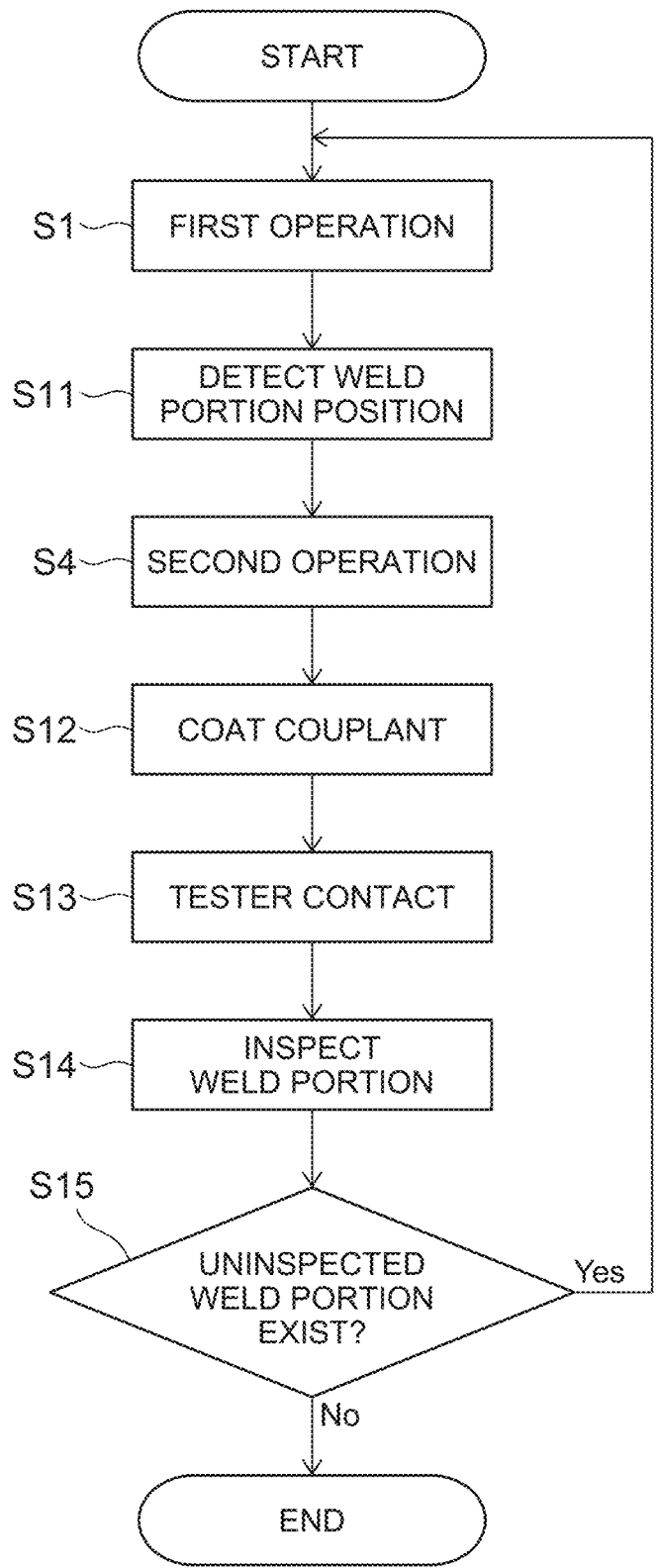
FIG. 13 is a flowchart illustrating the flow of the inspection by the robot system according to the embodiment.

FIG. 13 is a flowchart illustrating the flow of the inspection by the robot system according to the embodiment.

First, the control device 500 performs the first operation (step S1). The detector 400 images the member 5 and detects the position of the weld portion 53 from the acquired image (step S11). The control device 500 performs the second operation (step S4). The postures of the tester 310 and the coating device 320 are adjusted thereby. The calculation processing, the determination processing, and the correction operation illustrated in FIG. 8 or FIG. 9 may be performed between steps S11 and S4.

The coating device 320 coats the couplant 55 onto the weld portion 53 (step S12). The control device 500 moves the parallel link mechanism 200 to cause the tester 310 to contact the position at which the weld portion 53 is detected (step S13). The control device 500 inspects the weld portion 53 in the state in which the tester 310 contacts the weld portion 53 (step S14).

Specifically, the multiple ultrasonic sensors 312 transmit the ultrasonic wave US toward the member 5 including the weld portion 53 and receive the reflected wave RW. The tester 310 transmits the reception result of the reflected wave to the control device 500. The control device 500 calculates the tilt of the tester 310 with respect to the weld portion 53 based on the reception result. Based on the calculation result, the control device 500 adjusts the posture of the tip of the tester 310 by moving the parallel link mechanism 200 to reduce the tilt.

After adjusting the posture of the tester 310, the multiple ultrasonic sensors 312 re-transmit the ultrasonic wave US and receive the reflected wave RW. Based on the reflection result, the control device 500 determines whether or not the weld portion 53 is appropriately welded. The inspection of the weld portion 53 is completed thereby. The control device 500 determines whether or not an uninspected weld portion 53 exists (step S15). The operation ends when no uninspected weld portion 53 exists. When an uninspected weld portion 53 exists, the control device 500 re-performs the first operation for the uninspected weld portion 53.

A specific example of the method for calculating the tilt will now be described.

Figure 14:
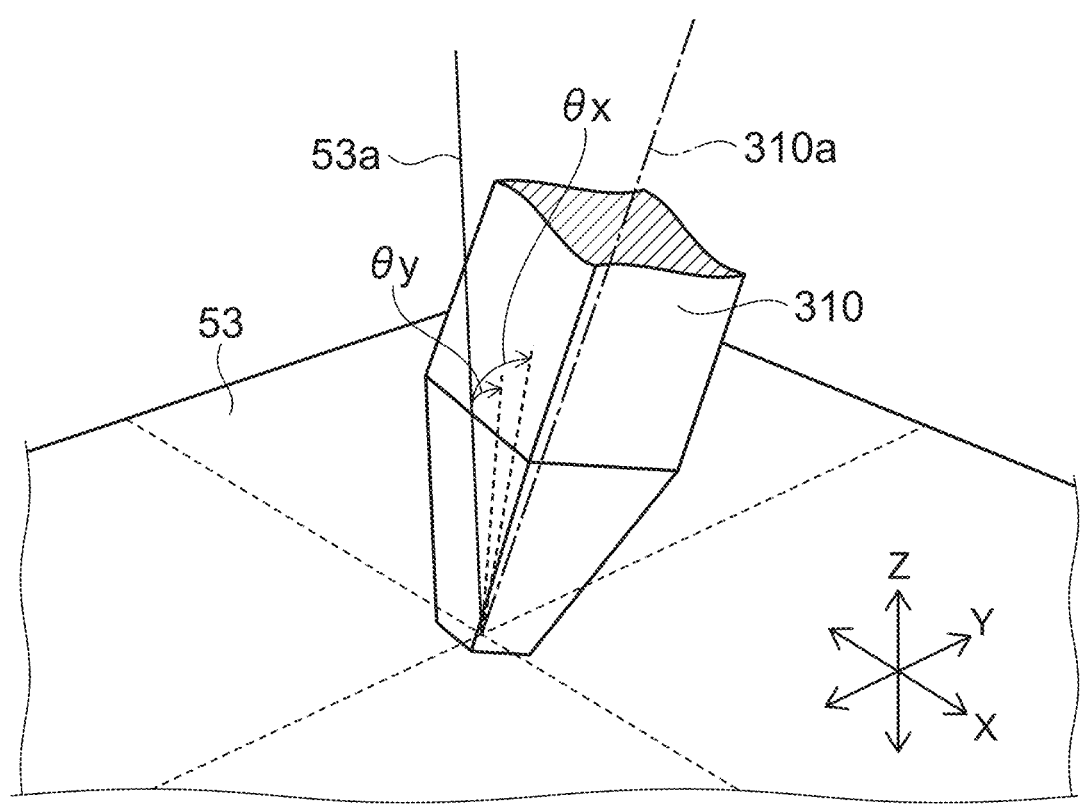
FIG. 14 is a drawing for describing a calculation method of tilt in the inspection.
Figure 15:
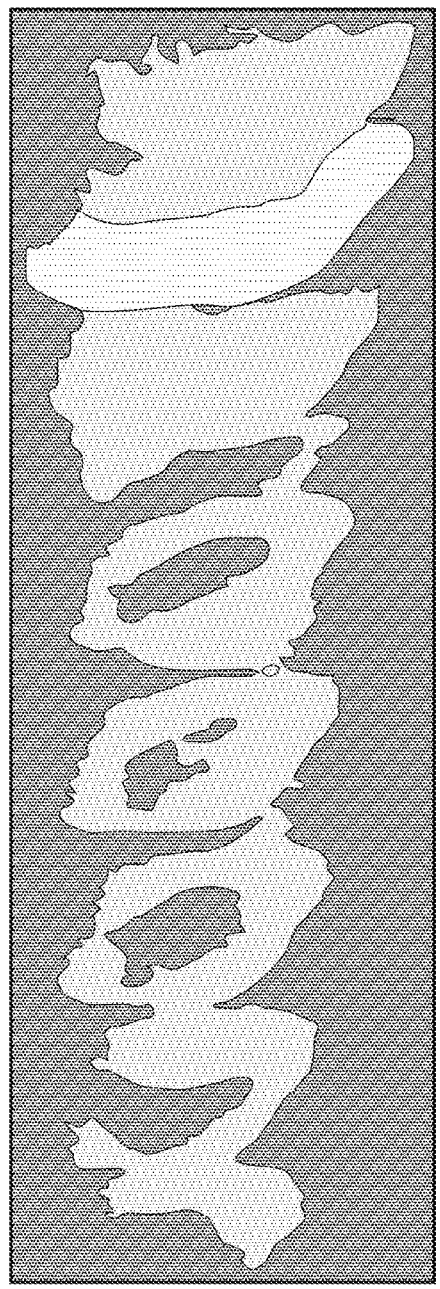
FIG. 15 is an example of an image obtained in the inspection.
Figure 15:
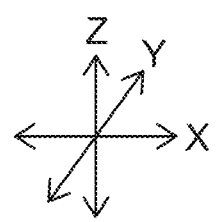

FIG. 14 is a drawing for describing the calculation method of the tilt of the inspection. FIGS. 15 and 16 are examples of images obtained in the inspection.

Figure 16A:
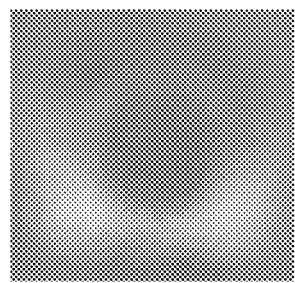
FIGS. 16A to 16C are an example of images obtained in the inspection.
Figure 16B:
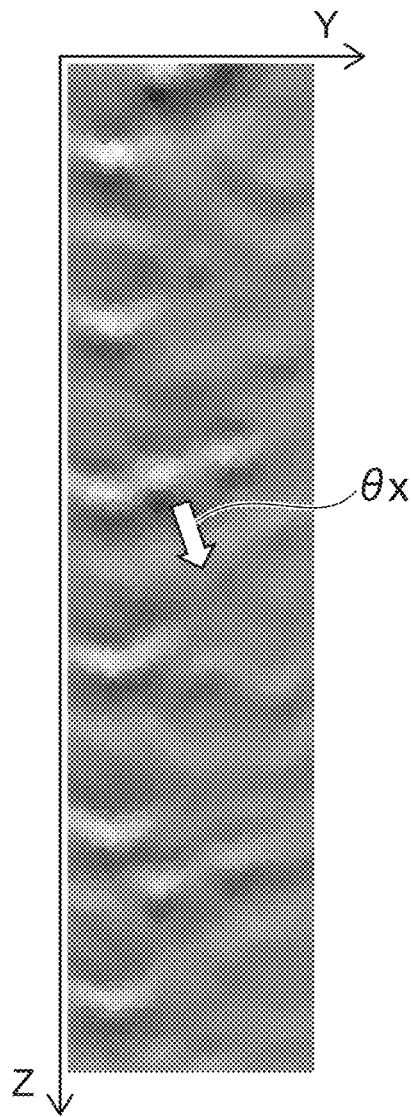
Figure 16C:
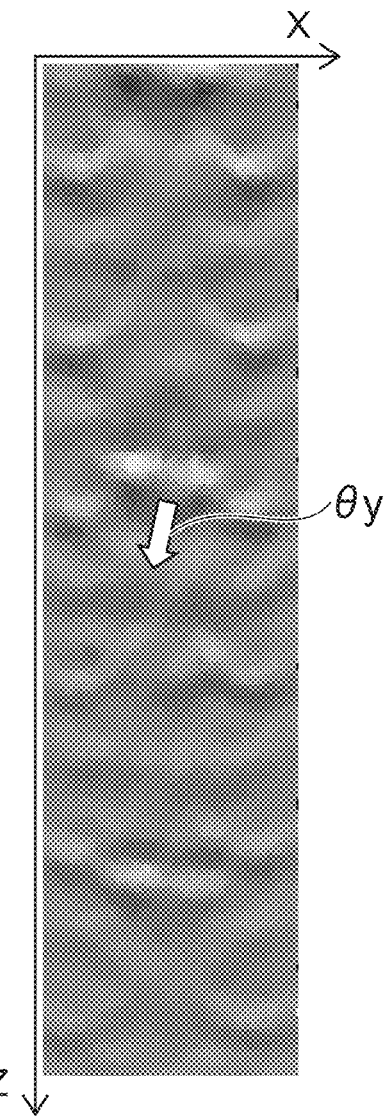

FIG. 15 is three-dimensional volume data depicted based on the detection result of the reflected wave. FIG. 16A illustrates the surface of the weld portion 53 in the volume data illustrated in FIG. 15. FIG. 16B illustrates a Y-Z cross section at the weld portion 53 vicinity in the volume data illustrated in FIG. 15. FIG. 16C illustrates an X-Z cross section at the weld portion 53 vicinity in the volume data illustrated in FIG. 15. In FIGS. 16B and 16C, the upper side is the surface of the weld portion 53; and the data in the depth direction is shown downward. Parts of high luminance are parts of high ultrasonic wave reflection intensity. The ultrasonic wave is intensely reflected by the bottom surface of the weld portion 53, the surfaces between unjoined members, etc.

The tilt of the tester 310 corresponds to the angle between a direction 310a of the tester 310 and a direction 53a perpendicular to the weld portion 53 illustrated in FIG. 14. This angle is represented by an angle θx around the X-direction and an angle θy around the Y-direction. The direction 310a of the tester 310 is perpendicular to the arrangement direction of the ultrasonic sensors 312.

As illustrated in FIG. 16B, the angle θx is calculated based on the detection result in the Y-Z cross section. As illustrated in FIG. 16C, the angle θy is calculated based on the detection result in the X-Z cross section. The control device 500 calculates the average of the three-dimensional luminance gradient of each cross section as the angles θx and θy. The control device 500 stores the calculated angles θx and θy in the memory device 510 as the tilt of the tester 310.

Here, an example is described in which the control device 500 controls the arm mechanism 100 and the parallel link mechanism 200 to perform processing related to an inspection. The control device is not limited to the example; a control device that controls the arm mechanism 100 and the parallel link mechanism 200 and another control device that performs the processing related to the inspection may be included. The processing that is related to the inspection may be performed by another control device or processing device via a network.

An example is described above in which the robot system 1 includes a vertical articulated arm mechanism 100 having six degrees of freedom. The arm mechanism 100 is not limited to the example; it is sufficient for the arm mechanism 100 to have not less than four degrees of freedom. With not less than four degrees of freedom, a fine adjustment of the posture of the control point can be made using the parallel link mechanism 200 after using the arm mechanism 100 to make a rough adjustment of the posture of the control point. Or, a horizontal articulated the arm mechanism 100 having not less than four degrees of freedom may be included. In either configuration, by using the parallel link mechanism 200 to adjust the posture of the control point, the occurrence of an unstable operation can be suppressed even when feedback control is used to adjust the posture of the control point.

Embodiments include the following configurations.
Configuration 1
A robot system, comprising:
an arm mechanism that is articulated;
a parallel link mechanism including
  a fixed part mounted to a distal part of the arm mechanism, and
  a movable part mounted to the fixed part via multiple parallel links, the movable part being movable with respect to the fixed part;
an end effector mounted to the movable part, the end effector performing a task on a task object;
a detector for detecting a position relationship or orientation relationship between the movable part and the task object; and
a control device controlling the arm mechanism and the parallel link mechanism, in the task of the end effector, the control device adjusts the posture of the end effector by moving the parallel link mechanism based on the detection result of the detector.

By using the robot system, the control method of the robot system, or the control device described above, the occurrence of an unstable operation can be suppressed even when the posture of the end effector 300 is adjusted by feedback control. Similar effects can be obtained by using a program that causes the control device of the robot system to perform the control method described above.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another recording medium.

For example, the data that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

While certain embodiments of the inventions have been illustrated, these embodiments have been presented by way of example only, and are not intended to limit the scope of the inventions. These novel embodiments may be embodied in a variety of other forms; and various omissions, substitutions, modifications, etc., can be made without departing from the spirit of the inventions. These embodiments and their modifications are within the scope and spirit of the inventions, and are within the scope of the inventions described in the claims and their equivalents. The embodiments described above can be implemented in combination with each other.

What is claimed is:
1. A robot system, comprising:
an arm mechanism that is articulated;
a parallel link mechanism having at least four degrees of freedom with respect to the arm mechanism, the parallel link mechanism including
  a fixed part mounted to a distal part of the arm mechanism, and
  a movable part mounted to the fixed part via a plurality of parallel links, the movable part being movable with respect to the fixed part;
an end effector mounted to the movable part, the end effector including a plurality of ultrasonic sensors;
a detector configured to detect a position or orientation of a control point, the control point being set at a part of the movable part or a part of the end effector; and
a control device configured to control the arm mechanism and the parallel link mechanism to control the position or orientation of the control point,
the control device being configured to perform
  a first operation of setting a posture of the control point to a first posture by moving the arm mechanism, the first posture being prescribed, and
  a second operation of setting the posture of the control point to a task posture by moving the parallel link mechanism based on a detection result of the detector, the second operation being performed after the first operation,
the end effector being configured to perform a task in the task posture, after the second operation, the control device being configured to
refer to a reception result of a reflected wave, the plurality of ultrasonic sensors transmitting an ultrasonic wave to a task object to obtain the reception result,
calculate an angle between the plurality of ultrasonic sensors and a direction perpendicular to the task object based on the reception result, and
move the parallel link mechanism so that the angle becomes smaller.

2. The robot system according to claim 1, wherein
between the first operation and the second operation, the control device performs:
calculation processing of calculating a displacement amount of the posture of the control point to the task posture based on the detection result of the detector; and
determination processing of determining whether or not the displacement amount is within a range of movement of the movable part, and
when the displacement amount exceeds the range of movement in the determination processing, the control device performs the second operation after causing the posture of the control point to approach the task posture by moving the arm mechanism.

3. The robot system according to claim 1, wherein
between the first operation and the second operation, the control device performs a correction operation of setting the posture of the control point to a correction posture by moving the arm mechanism based on the detection result of the detector,
in the correction operation, the control device sets the correction posture so that the posture of the distal part of the arm mechanism is outside a singularity, and
the singularity is a posture for which rotation angles of rotary shafts included in the arm mechanism cannot be determined by an inverse kinematics calculation.

4. The robot system according to claim 1, wherein
when the task is being performed by the end effector, the control device adjusts the posture of the control point by moving the parallel link mechanism based on the detection result of the detector.

5. A control method of a robot system,
the robot system including:
an arm mechanism that is articulated;
a parallel link mechanism having at least four degrees of freedom with respect to the arm mechanism, the parallel link mechanism including
a fixed part mounted to a distal part of the arm mechanism, and
a movable part mounted to the fixed part via a plurality of parallel links,
the movable part being movable with respect to the fixed part;
an end effector mounted to the movable part, the end effector including a plurality of ultrasonic sensors; and
a detector configured to detect a position or orientation of a control point, the control point being set at a part of the movable part or a part of the end effector,
the method comprising:
a first step of setting a posture of the control point to a first posture by moving the arm mechanism, the first posture being prescribed;
a second step of setting the posture of the control point to a task posture by moving the parallel link mechanism based on a detection result of the detector, the second step being performed after the first step, the end effector performing a task in the task posture;
referring to a reception result of a reflected wave after the second step, the plurality of ultrasonic sensors transmitting an ultrasonic wave to a task object to obtain the reception result;
calculating an angle between the plurality of ultrasonic sensors and a direction perpendicular to the task object based on the reception result; and
moving the parallel link mechanism so that the angle becomes smaller.

6. The control method according to claim 5, further comprising:
a calculation step of calculating a displacement amount of the posture of the control point to the task posture based on the detection result of the detector; and
a determination step determining whether or not the displacement amount is within a range of movement of the movable part,
the calculation step and the determination step being performed between the first step and the second step,
when the displacement amount exceeds the range of movement in the determination step, the second step is performed after causing the posture of the control point to approach the task posture by moving the arm mechanism.

7. The control method according to claim 5, further comprising:
a correction step of setting the posture of the control point to a correction posture by moving the arm mechanism based on the detection result of the detector,
the correction step being performed between the first step and the second step,
in the correction step, the correction posture being set so that the posture of the distal part of the arm mechanism is outside a singularity,
the singularity being a posture for which rotation angles of rotary shafts included in the arm mechanism cannot be determined by an inverse kinematics calculation.

8. The control method according to claim 5, wherein
when the task is being performed by the end effector, the posture of the control point is adjusted by moving the parallel link mechanism based on the detection result of the detector.

9. A control device controlling a robot system,
the robot system including:
an arm mechanism that is articulated;
a parallel link mechanism having at least four degrees of freedom with respect to the arm mechanism, the parallel link mechanism including
a fixed part mounted to a distal part of the arm mechanism, and
a movable part mounted to the fixed part via a plurality of parallel links,
the movable part being movable with respect to the fixed part;
an end effector mounted to the movable part, the end effector including a plurality of ultrasonic sensors; and
a detector configured to detect a position or orientation of a control point, the control point being set at a part of the movable part or a part of the end effector,
the control device performing:
a first operation of setting a posture of the control point to a first posture by moving the arm mechanism, the first posture being prescribed;

a second operation of setting the posture of the control point to a task posture by moving the parallel link mechanism based on a detection result of the detector, the second operation being after the first operation, the end effector performing a task in the task posture;

referring to a reception result of a reflected wave after the second operation, the plurality of ultrasonic sensors transmitting an ultrasonic wave to a task object to obtain the reception result;

calculating an angle between the plurality of ultrasonic sensors and a direction perpendicular to the task object based on the reception result; and moving the parallel link mechanism so that the angle becomes smaller.

10. The control device according to claim 9, wherein between the first operation and the second operation, the control device further performs:

calculation processing of calculating a displacement amount of the posture of the control point to the task posture based on the detection result of the detector; and determination processing of determining whether or not the displacement amount is within a range of movement of the movable part, when the displacement amount exceeds the range of movement in the determination processing, the control device performs the second operation after causing the posture of the control point to approach the task posture by moving the arm mechanism.

11. The control device according to claim 9, wherein between the first operation and the second operation, the control device performs a correction operation of setting the posture of the control point to a correction posture by moving the arm mechanism based on the detection result of the detector, and in the correction operation, the control device sets the correction posture so that the posture of the distal part of the arm mechanism is outside a singularity, and the singularity is a posture for which rotation angles of rotary shafts included in the arm mechanism cannot be determined by an inverse kinematics calculation.

12. The control device according to claim 9, wherein when the task is being performed by the end effector, the control device adjusts the posture of the control point by moving the parallel link mechanism based on the detection result of the detector.

13. A non-transitory computer-readable storage medium storing a program, the program causing a control device to perform a first operation and a second operation, the control device controlling a robot system, the robot system including:

an arm mechanism that is articulated;

a parallel link mechanism having at least four degrees of freedom with respect to the arm mechanism, the parallel link mechanism including a fixed part mounted to a distal part of the arm mechanism, and a movable part mounted to the fixed part via a plurality of parallel links, the movable part being movable with respect to the fixed part;

an end effector mounted to the movable part, the end effector including a plurality of ultrasonic sensors; and a detector configured to detect a position or orientation of a control point, the control point being set at a part of the movable part or a part of the end effector, the first operation setting a posture of the control point to a first posture by moving the arm mechanism, the first posture being prescribed, the second operation setting the posture of the control point to a task posture by moving the parallel link mechanism based on a detection result of the detector, the second operation being after the first operation, the end effector performing a task in the task posture, after the second operation, the program further causing the control device to refer to a reception result of a reflected wave, the plurality of ultrasonic sensors transmitting an ultrasonic wave to a task object to obtain the reception result, calculate an angle between the plurality of ultrasonic sensors and a direction perpendicular to the task object based on the reception result, and move the parallel link mechanism so that the angle becomes smaller.

14. The storage medium according to claim 13, wherein between the first operation and the second operation, the program further causes the control device to perform:

calculation processing of calculating a displacement amount of the posture of the control point to the task posture based on the detection result of the detector; and determination processing of determining whether or not the displacement amount is within a range of movement of the movable part, and when the displacement amount exceeds the range of movement in the determination processing, the program causes the control device to perform the second operation after causing the posture of the control point to approach the task posture by moving the arm mechanism.

15. The storage medium according to claim 13, wherein between the first operation and the second operation, the program causes the control device to perform a correction operation of setting the posture of the control point to a correction posture by moving the arm mechanism based on the detection result of the detector, in the correction operation, the program causes the control device to set the correction posture so that the posture of the distal part of the arm mechanism is outside a singularity, and the singularity is a posture for which rotation angles of rotary shafts included in the arm mechanism cannot be determined by an inverse kinematics calculation.

16. The storage medium according to claim 13, wherein when the task is being performed by the end effector, the program causes the control device to adjust the posture of the control point by operating the movable part based on the detection result of the detector.

* * * * *